(12) United States Patent
Kokubu et al.

(10) Patent No.: US 9,442,569 B2
(45) Date of Patent: Sep. 13, 2016

(54) OPERATION APPARATUS, DISPLAY DEVICE, AND IMAGING APPARATUS

(71) Applicant: OLYMPUS CORPORATION, Shibuya-ku, Tokyo (JP)

(72) Inventors: Kento Kokubu, Tachikawa (JP); Toru Miyajima, Hachioji (JP); Sumio Kawai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/537,721

(22) Filed: Nov. 10, 2014

(65) Prior Publication Data
US 2015/0138387 A1 May 21, 2015

(30) Foreign Application Priority Data
Nov. 19, 2013 (JP) ................................ 2013-239292

(51) Int. Cl.
| | |
|---|---|
| H04N 5/225 | (2006.01) |
| H04N 5/232 | (2006.01) |
| G06F 3/01 | (2006.01) |
| G06F 3/041 | (2006.01) |
| G06F 3/0488 | (2013.01) |
| G03B 17/02 | (2006.01) |

(52) U.S. Cl.
CPC ............. *G06F 3/016* (2013.01); *G03B 17/02* (2013.01); *G06F 3/041* (2013.01); *G06F 3/04886* (2013.01); *H04N 5/2251* (2013.01); *H04N 5/232* (2013.01)

(58) Field of Classification Search
CPC .... G06F 3/016; G06F 3/04886; G06F 3/041; H04N 5/23216; H04N 1/00411; H04N 2005/443; H04N 21/42224; H04N 1/00549; H04N 13/0493

USPC ......... 348/14.03, 14.07, 211.8, 333.01, 348/E5.046
See application file for complete search history.

(56) References Cited

U.S. PATENT DOCUMENTS

| | | | | |
|---|---|---|---|---|
| 5,598,527 | A | * | 1/1997 | Debrus ............. G06F 3/044 341/22 |
| 6,154,210 | A | * | 11/2000 | Anderson ......... G03B 17/02 345/173 |
| 9,335,868 | B2 | * | 5/2016 | Hotelling .......... G06F 3/044 |
| 2002/0158838 | A1 | * | 10/2002 | Smith ............. G06F 3/03547 345/156 |

(Continued)

FOREIGN PATENT DOCUMENTS

| | | |
|---|---|---|
| JP | 2012008306 A | 1/2012 |
| JP | 2013008151 A | 1/2013 |
| JP | 2013105356 A | 5/2013 |

*Primary Examiner* — Hung Lam
(74) *Attorney, Agent, or Firm* — Holtz, Holtz & Volek PC

(57) ABSTRACT

An operation apparatus includes a touch detection section, a vibration section, a setting section and a control section. The touch detection section is provided on an exterior part, and outputs a signal when touched by an user. The vibration section is provided on the touch detection section in an overlapping manner, and vibrates when the touch of the user is detected by the touch detection section. The setting section is configured to set a function to be carried out when the touch detection section is touched. The control section is configured to determine a touch position of the touch detection section, provided on the touch detection section of the determined touch position, and configured to cause the vibration section to vibrate, and output a signal used to cause the function.

10 Claims, 17 Drawing Sheets

(56) References Cited

U.S. PATENT DOCUMENTS

| | | | |
|---|---|---|---|
| 2009/0167704 A1* | 7/2009 | Terlizzi | G06F 3/016 345/173 |
| 2010/0156818 A1* | 6/2010 | Burrough | G06F 3/016 345/173 |
| 2013/0285910 A1* | 10/2013 | Adachi | G06F 3/03547 345/159 |
| 2014/0084204 A1* | 3/2014 | Tanimoto | C08J 5/18 252/62.9 R |
| 2014/0176455 A1* | 6/2014 | Araki | G06F 3/016 345/173 |
| 2014/0185140 A1* | 7/2014 | Kawai | G02B 27/0006 359/508 |
| 2015/0212579 A1* | 7/2015 | Nakamura | G06F 1/1626 345/173 |

* cited by examiner

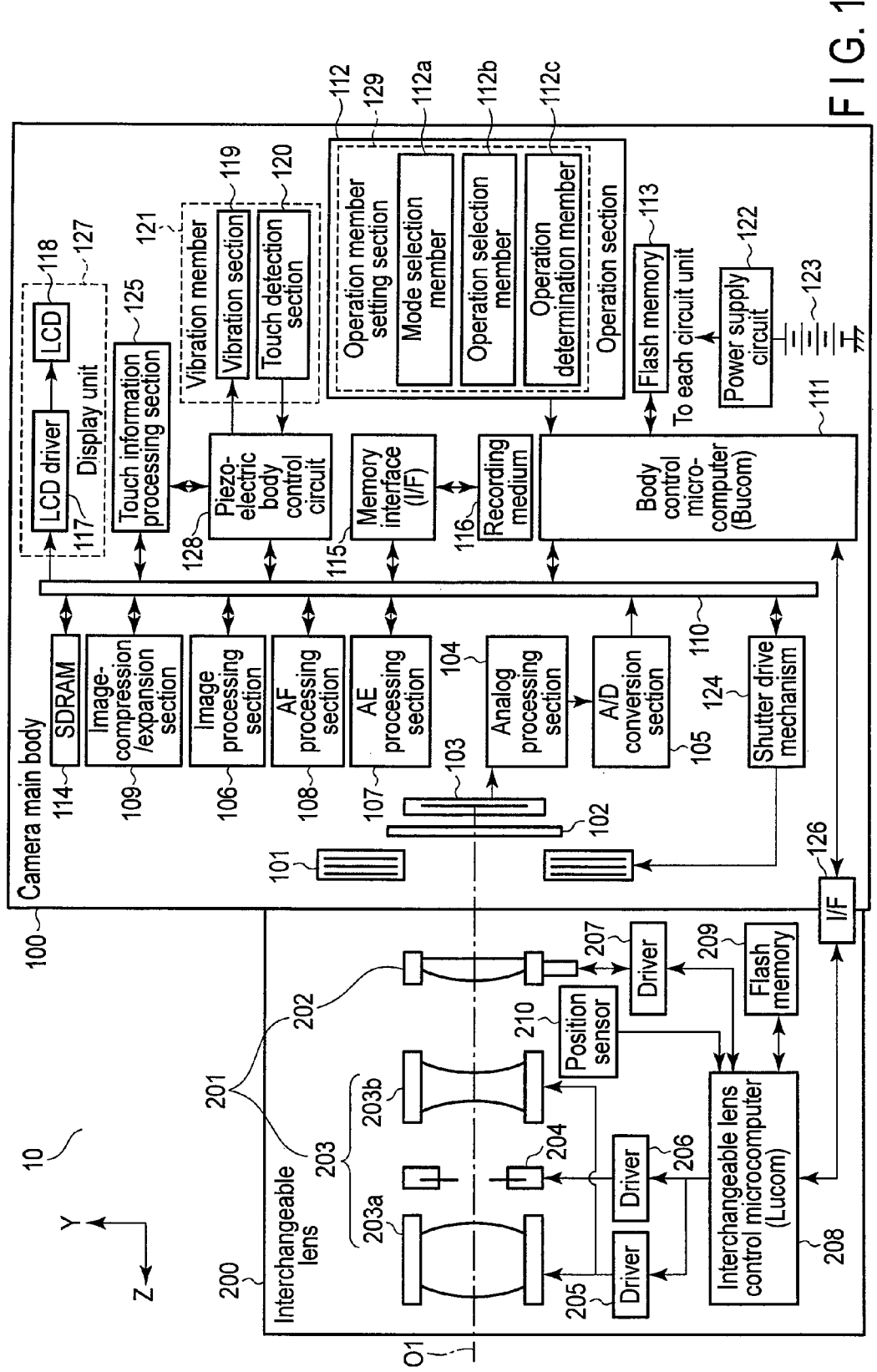
F I G. 1

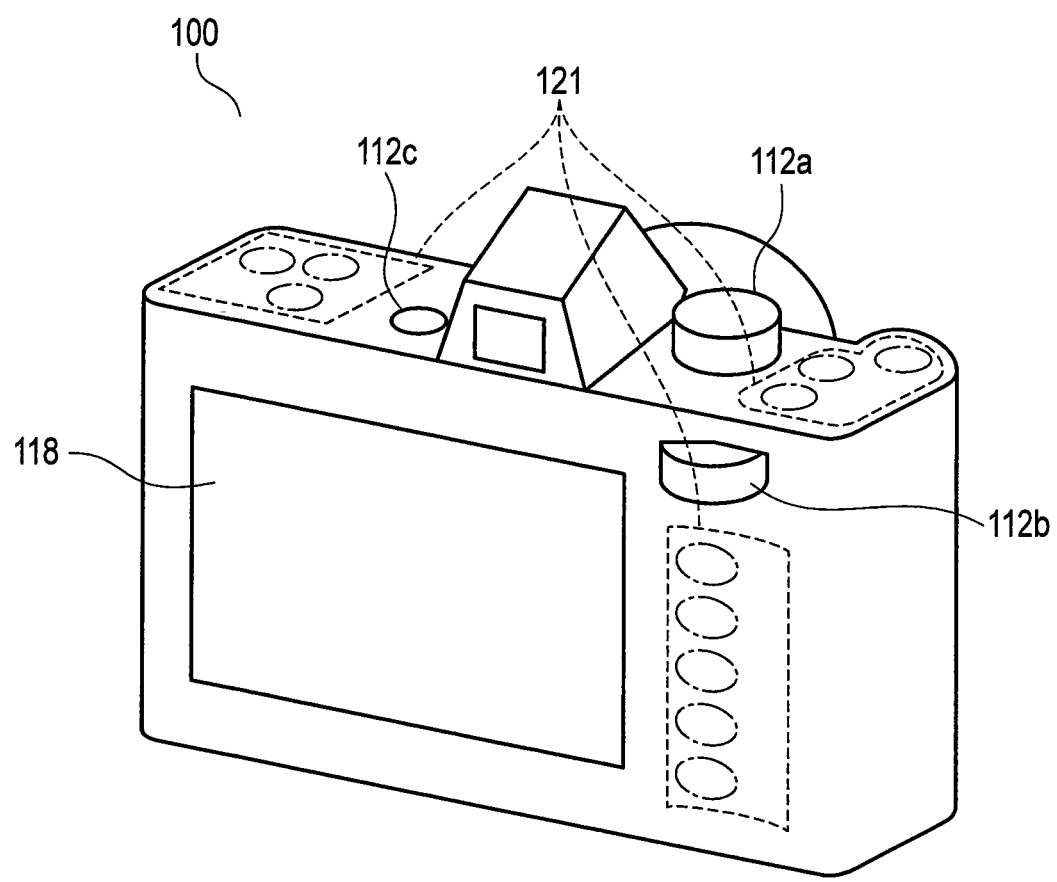
F I G. 2

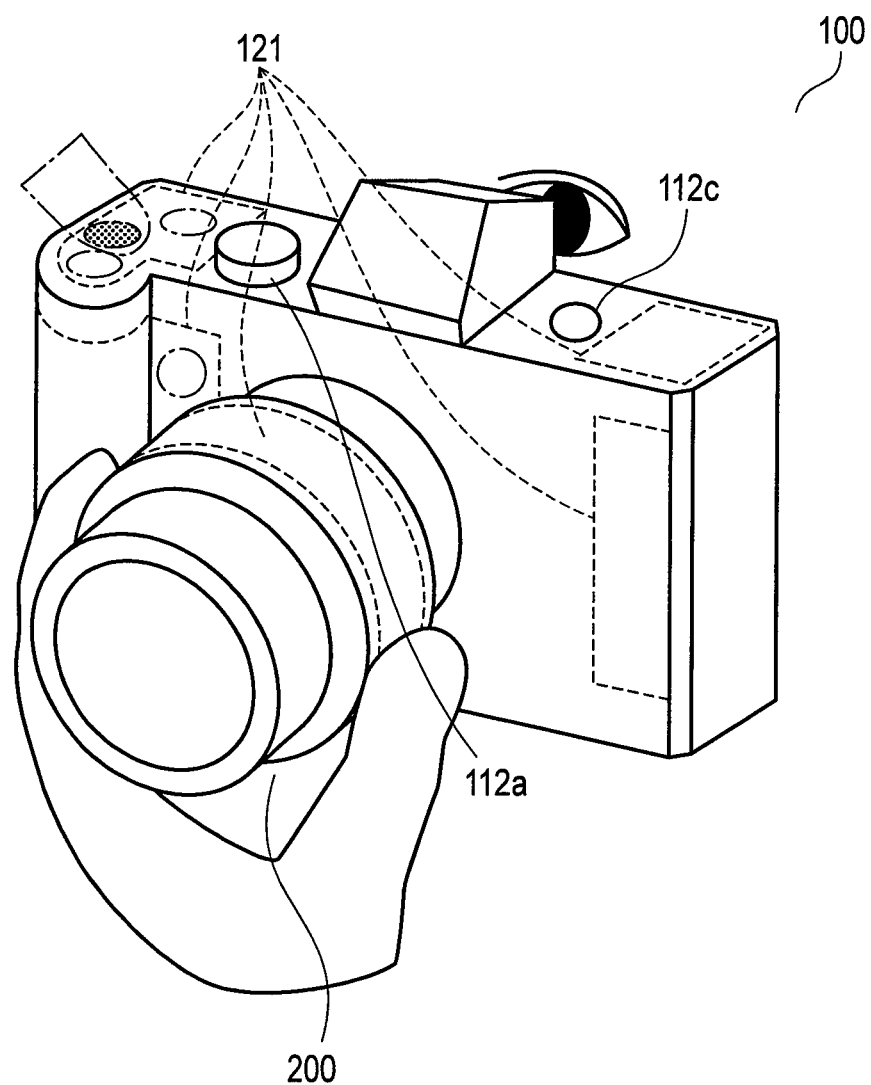
F I G. 3

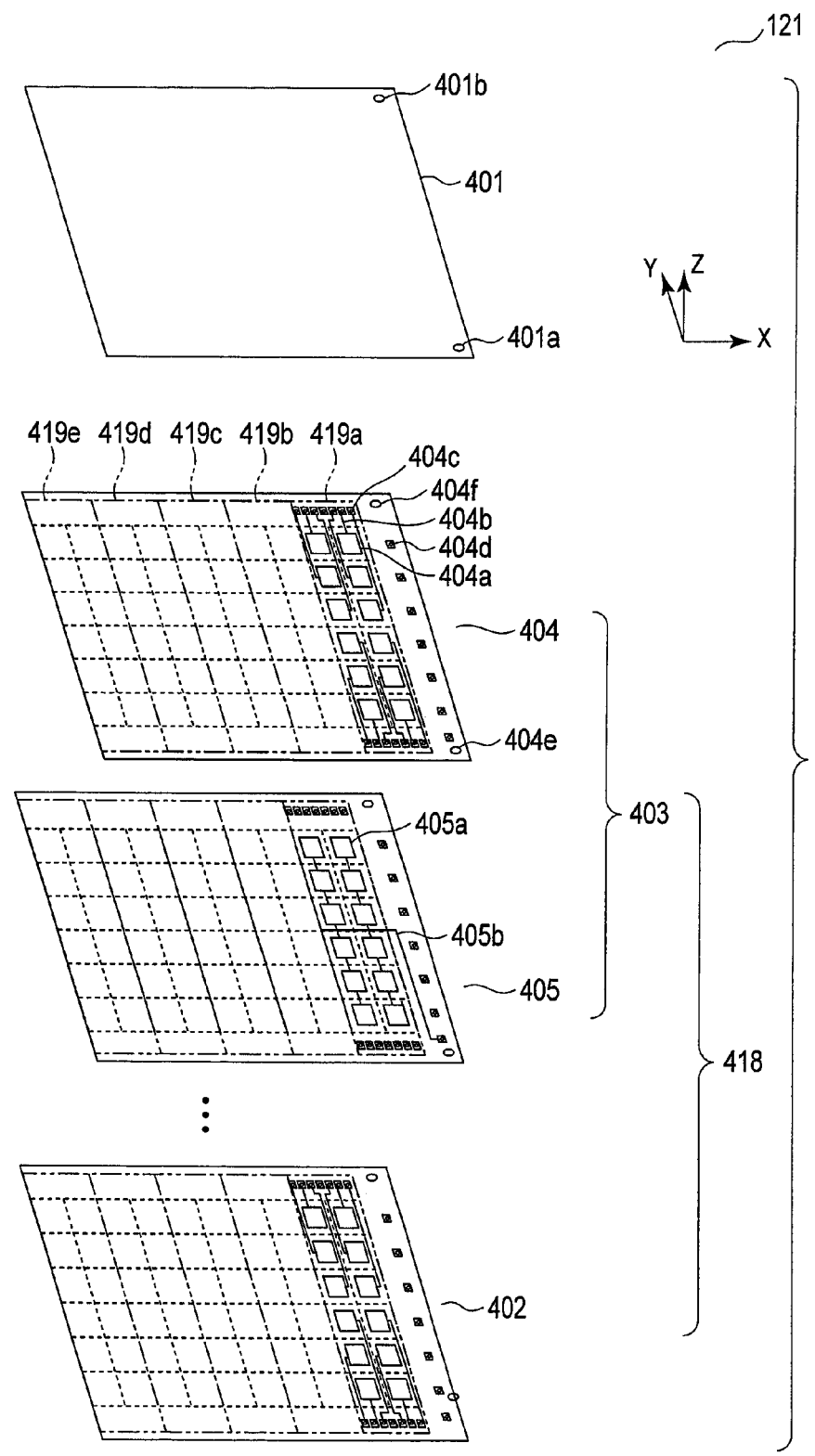
F I G. 4A

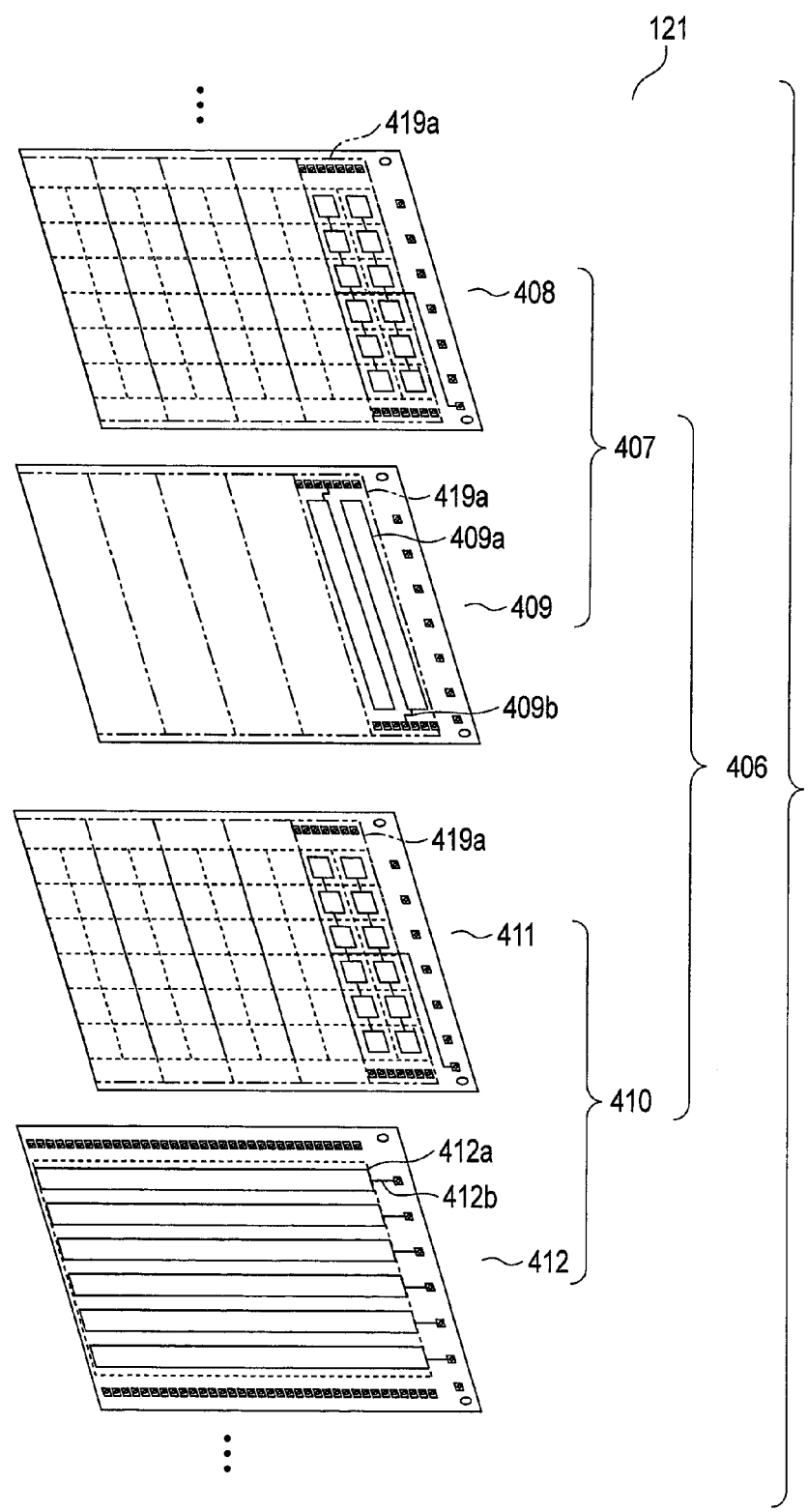
F I G. 4B

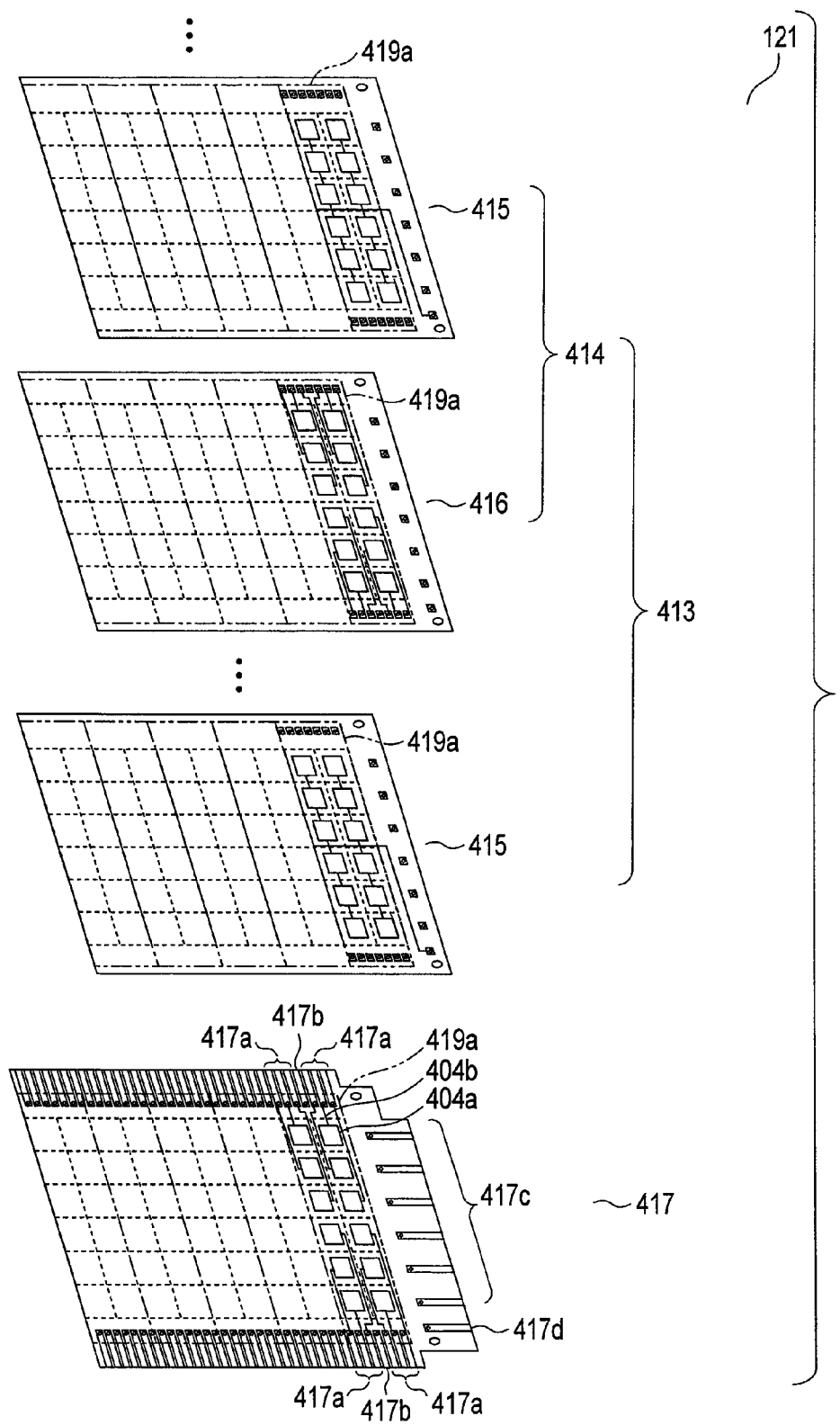
F I G. 4C

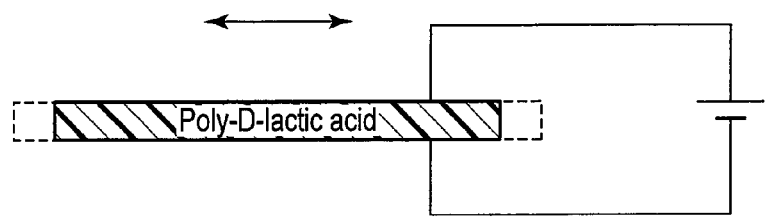
F I G. 9A
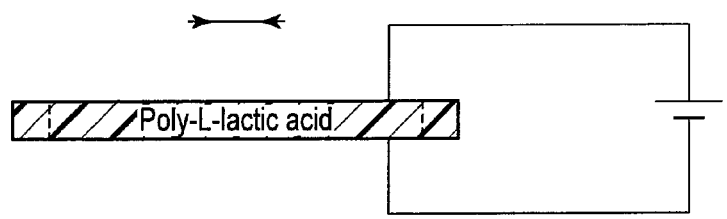
F I G. 9B
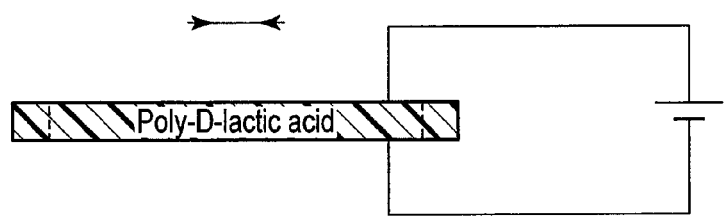
F I G. 9C
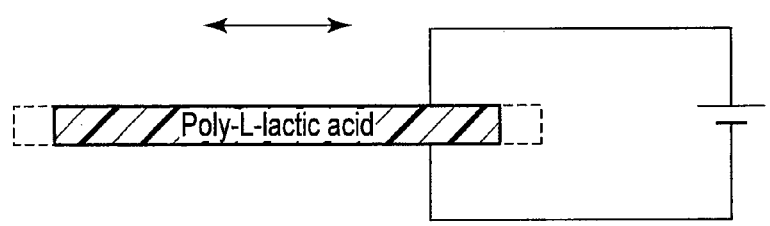
F I G. 9D
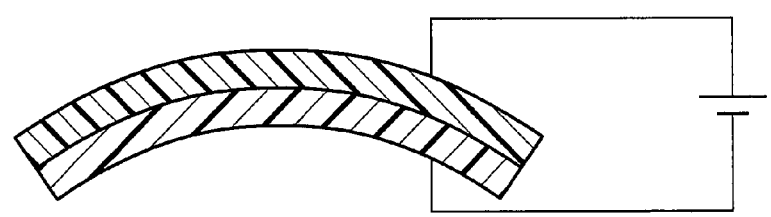
F I G. 9E

OPERATION APPARATUS, DISPLAY DEVICE, AND IMAGING APPARATUS

CROSS-REFERENCE TO RELATED APPLICATIONS

This application is based upon and claims the benefit of priority from the prior Japanese Patent Application No. 2013-239292, filed Nov. 19, 2013, the entire contents of which are incorporated herein by reference.

BACKGROUND OF THE INVENTION

1. Field of the Invention

The present invention relates to an operation apparatus, display device, and imaging apparatus.

2. Description of the Related Art

In recent years, an image apparatus such as an apparatus capable of shooting not only a still image but also a moving image, for example, a digital camera or a mobile apparatus equipped with a digital camera is commercialized. Further, the camera or the image apparatus is provided with a liquid-crystal monitor at an exterior part thereof. The user carries out various setting operations or imaging by operating an operation member such as an operation button, dial or the like displayed on the liquid-crystal monitor or an operation member such as a mechanical button, a dial or the like provided at the exterior part. Further, in recent years, size reduction of cameras or other mobile apparatuses is advanced. On the other hand, for these apparatuses, a shooting function of a moving image or still image, or some other function is added, and the tendency toward multifunctionality is advanced. With the advancement of multifunctionality, operation members necessary for cameras or other mobile apparatuses have been increased. Concomitantly with the reduced size of each apparatuses, in order to enable the user to sufficiently carry out multifunctional operations, for example, a proposal or the like to reduce the size of operation members or to assign several types of functions to one operation member is made. However, such a proposal may cause a problem of difficulty in operation of the operation member or complication of operation.

Incidentally, in shooting, confirmation of an object is often carried out by using a liquid-crystal monitor provided on the exterior of the apparatus or a built-in finder. Accordingly, a problem that it is difficult for the user to visually confirm the operation member while he or she views the monitor or the like is caused. There is the possibility of the problem being solved by employing a mechanical operation member which can be operated without visual confirmation in the imaging apparatus as an operation member essential to the camera operation. Here, however, the form of the hand or the finger of the user or the dominant arm varies according to the individual. It is thus difficult to make the mechanical operation member flexibly conform to the form of the hand or the finger for each user. Thus, an apparatus such as a digital camera or the like which can be operated without visually confirming the operation member, and in which a function for each operation member can be changed according to the user is desired.

In response to such need, Jpn. Pat. Appln. KOKAI Publication No. 2012-8306 discloses an imaging apparatus which detects a camera operation position of the operator to customize the operation member. This imaging apparatus detects a position at which the apparatus is touched by the camera operator by using a touch sensor provided on the camera, and the position is registered in the camera as the camera operator, whereby it is possible for the apparatus to customize the contact position of the finger in association with each function such as the focusing function, shutter function or the like.

Further, Jpn. Pat. Appln. KOKAI Publication No. 2013-105356 discloses a camera in which an uneven seal is stuck on the display means (liquid-crystal touch panel) including input means (operation member) used for a touch operation. This camera detects a part on which the uneven seal is stuck, and can set a touch operation member (dial or the like).

Furthermore, Jpn. Pat. Appln. KOKAI Publication No. 2013-8151 discloses an electronic apparatus including a vibrating operation section, and a touch-detection-capable display panel provided adjacent to the operation section through space. In this electronic apparatus, the display panel is capable of touch detection, and hence it is possible for the apparatus to correlate visual display, and vibration of the operation section with each other. This electronic apparatus applies vibration to a display position of an operation member for which a position or a size is determined. The user obtains a tactile feeling from the operation member by the vibration, and can obtain an operational feeling of being in contact with a button or pressing a button. However, with this electronic apparatus, it is difficult to change the position or the size of the operation member. Further, regarding this electronic apparatus, it is not disclosed that when a plurality of positions are touched, vibration is generated according to positions on an image displayed on an operation member of the touch positions.

BRIEF SUMMARY OF THE INVENTION

An operation apparatus according to a first aspect of the invention comprises: a touch detection section provided on an exterior part, and configured to output a signal when touched by the user; and a vibration section provided on the touch detection section in an overlapping manner, and configured to vibrate when the touch of the user is detected by the touch detection section; a setting section configured to set a function to be carried out when the touch detection section is touched; and a control section configured to determine a touch position of the touch detection section provided on a surface of the exterior part on the basis of a signal from the touch detection section, provided on the touch detection section of the determined touch position in an overlapping manner, and configured to cause the vibration section to vibrate, and output a signal used to cause the function set by the setting section to be executed.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration example of a digital camera which is an image apparatus provided with an operation apparatus according to an embodiment of the present invention;

FIG. 2 is a perspective view of a camera provided with the operation apparatus according to the embodiment of the present invention viewed from the back side;

FIG. 3 is a perspective view of the camera provided with the operation apparatusunit according to the embodiment of the present invention viewed from the front side;

FIG. 4A is a first view of exploded perspective views showing an example of the configuration of a vibration member;

FIG. 4B is a second view of the exploded perspective views showing an example of the configuration of the vibration member;

FIG. 4C is a third view of the exploded perspective views showing an example of the configuration of the vibration member;

FIG. 9A is a view for explaining a poly-L-lactic acid sheet, and poly-D-lactic acid sheet;

FIG. 9B is a view for explaining a poly-L-lactic acid sheet, and poly-D-lactic acid sheet;

FIG. 9C is a view for explaining a poly-L-lactic acid sheet, and poly-D-lactic acid sheet;

FIG. 9D is a view for explaining a poly-L-lactic acid sheet, and poly-D-lactic acid sheet;

FIG. 9E is a view for explaining a poly-L-lactic acid sheet, and poly-D-lactic acid sheet;

DETAILED DESCRIPTION OF THE INVENTION

Figure 5:
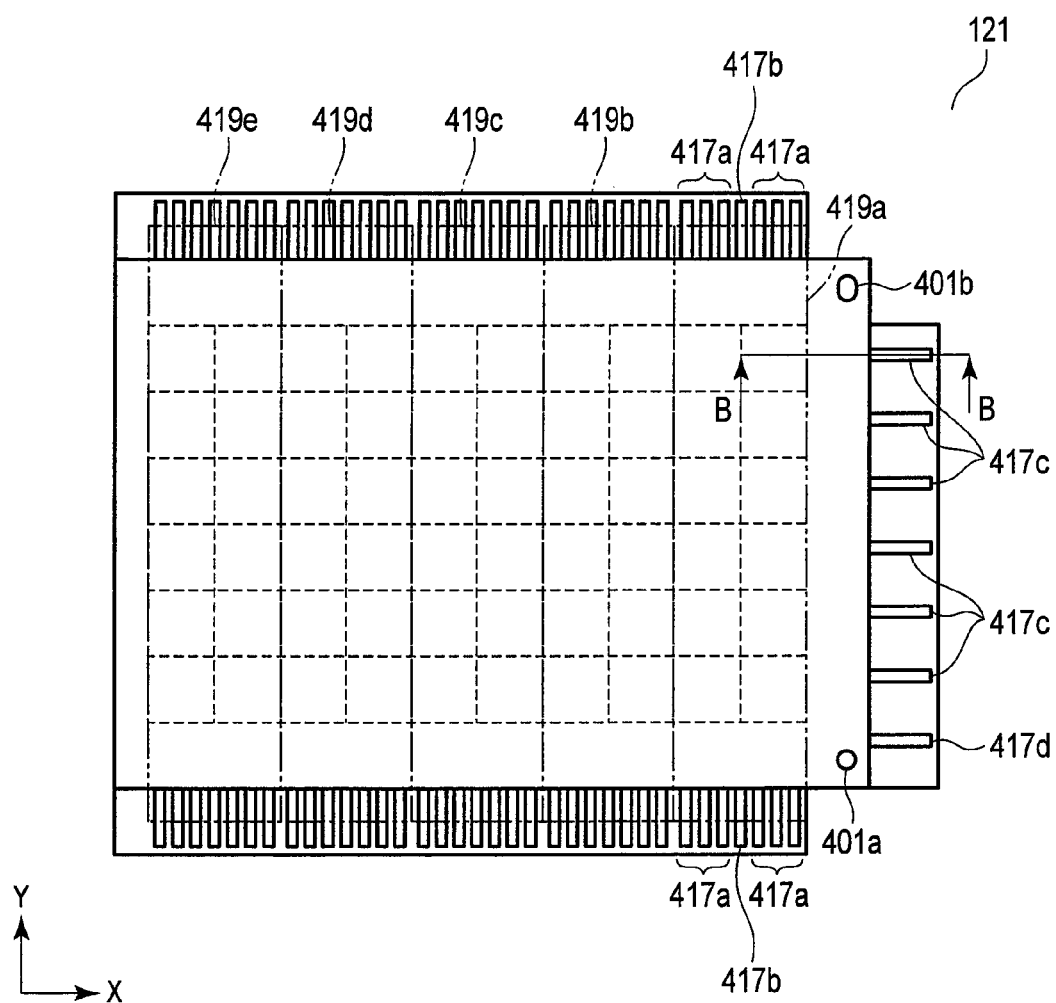
FIG. 5 is a view of the vibration member viewed from the flat plate side.

Hereinafter, an operation apparatus according to an embodiment of the present invention will be described. Here, in each of the drawings used in the following description, it is assumed that each of the constituent elements has a size of such a degree that the element can be recognized on the drawing, and the constituent elements are different from each other in terms of scale. Further, the number of each of the constituent elements, shape of each of the constituent elements, ratios between the sizes of the constituent elements, and relative positional relationships between the constituent elements are not limited to those shown in the drawings.

Furthermore, in the following description, a direction from a camera main body 100 to an object is referred to as the front, and a direction opposite to the front is referred to as the back. Further, an axis coinciding with an optical axis O1 of an optical system of an interchangeable lens 200 is made the z-axis, and two axes perpendicular to each other on a plane perpendicular to the z-axis are made the x-axis, and y-axis.

Hereinafter, an embodiment of the present invention will be described with reference to the drawings. FIG. 1 is a block diagram showing the configuration of an image apparatus provided with a display device according to the embodiment of the present invention. The image apparatus in the embodiment of the present invention is a digital camera.

A digital camera 10 shown in FIG. 1 includes an interchangeable lens 200 and camera main body 100. The interchangeable lens 200 and camera main body 100 are connected to each other so that they can communicate with each other through an interface (I/F) 126.

The interchangeable lens 200 includes a taking lens 201, drivers 205, 206, and 207, interchangeable lens control microcomputer (Lucom) 208, flash memory 209, and position sensor 210.

The taking lens 201 is an optical system configured to form an optical image of the object, and includes a focus lens 202, variable magnification lens 203, and diaphragm 204. The focus lens 202 forms an optical image of the object on a light-receiving surface of an imaging element 103 of the camera main body 100. The variable magnification lens 203 changes the magnification of the object image by changing the focal distance of the taking lens 201. The diaphragm 204 operates a diaphragm blade to change the amount of light of the optical image of the object incident on the camera main body 100. Here, although the focus lens 202 is configured to be driven alone at the time of focusing, the focus lens may also be configured to be driven when the variable magnification lens 203 is driven, i.e., in tandem with magnification variation. Further, each of the lenses shown in FIG. 1 may be a single lens or may be constituted of a plurality of lenses. Furthermore, an optical element such as an optical filter or the like may be interposed between the lenses shown in FIG. 1.

The driver 205 drives the variable magnification lens 203 in the optical axis O1 direction for the magnification varying operation. The driver 206 drives the diaphragm blade of the diaphragm 204 to adjust the amount of light of the optical image of the object. The driver 207 drives the focus lens 202 in the optical axis O1 direction in order to adjust the focus of the taking lens 201. Each of the drivers 205, 206, and 207 includes an actuator such as a stepping motor, voice coil motor (VCM), ultrasonic motor or the like.

The Lucom 208 controls the circuit units such as the drivers 205, 206, 207, and the like. The Lucom 208 carries out communication with a body control microcomputer (Bucom) 111 of the camera main body 100 through the interface (I/F) 126. Further, the Lucom 208 carries out various control operations according to necessary information obtained from the flash memory 209. The flash memory 209 stores therein various information items necessary for the operation of the interchangeable lens 200. Furthermore, the Lucom 208 acquires position information about the focus lens 202 from the position sensor 210 in order to adjust the focus of the taking lens 201.

The position sensor 210 detects a position signal of the focus lens 202, and outputs the detected position signal to the Lucom 208. Here, the position sensor 210 is a sensor, for example, a Hall element, giant magnetoresistive (GMR) element or the like. Further, the interchangeable lens 200 includes a position detection mechanism (not shown in FIG. 1) configured to detect a position of a movable part of each of the variable magnification lens 203, and diaphragm 204.

The camera main body 100 includes a shutter 101, shutter drive mechanism 124, optical element 102, imaging element 103, analog processing section 104, analog/digital conversion section (A/D conversion section) 105, AE processing section 107, AF processing section 108, touch information processing section 125, image processing section 106, image-compression/expansion section 109, vibration member 121, display unit 127, piezoelectric body control circuit 128, recording medium 116, memory interface (memory I/F) 115, SDRAM 114, bus 110, Bucom 111, flash memory 113, operation section 112, operation member setting section 129, battery 123, power supply circuit 122, and interface (I/F) 126.

The shutter 101 is arranged in front of the light-receiving surface of the imaging element 103. The shutter 101 controls the exposure of the imaging element 103 by bringing the light-receiving surface of the imaging element 103 to an exposed state or a light-blocking state. The shutter drive mechanism 124 opens/closes the shutter 101 by driving a shutter wing of the shutter 101.

The optical element 102 includes a dust filter, optical low-pass filter, infrared cutoff filter, and the like which are not shown, and is arranged in front of the light-receiving surface of the imaging element 103. The dust filter produces ultrasonic vibration to thereby remove dust appearing in the image. It should be noted that when the dust filter is provided in the optical element 102, it is necessary to further incorporate a drive circuit for the dust filter in the configuration of the digital camera 10. The optical low-pass filter removes higher components of the spatial frequency of the optical image formed by the taking lens 201. The infrared cutoff filter removes the infrared component included in the optical image formed by the taking lens 201.

The imaging element 103 receives the optical image formed by the taking lens 201 by the light-receiving surface thereof, and converts the received optical image into an electric signal (hereinafter referred to as an image signal). Here, the imaging element 103 includes a phase difference detection pixel (not shown) at part of the light-receiving surface. The phase difference detection pixel outputs phase difference information indicating a distance between the object, and digital camera 10 on the basis of a pair of light rays emitted from a specific area of an exit pupil of the taking lens 201. The analog processing section 104 carries out analog processing such as removal or the like of noise of an electric signal obtained by the imaging element 103. The A/D conversion section 105 converts an analog signal obtained by the analog processing section 104 into a digital image signal (hereinafter referred to as image data). It should be noted that the imaging element 103, analog processing section 104, and A/D conversion section 105 correspond to an image acquisition section configured to acquire an image.

The AE processing section 107 measures the light emitted from the object to output information used for controlling exposure of the image at the time of shooting to the Bucom 111. The AF processing section 108 outputs information for controlling the focus lens 202 to position the lens 202 in the in-focus position to the Bucom 111 on the basis of the phase difference information detected by the phase difference detection pixel of the imaging element 103.

The image processing section 106 subjects the image data obtained by the A/D conversion section 105 to image processing to create image data for recording. The image-compression/expansion section 109 compresses image data or restores the compressed image data to the original image data.

The display unit 127 includes an LCD 118, and LCD driver 117. The LCD 118 is a display section configured to display an image obtained by shooting or information or the like at the time of shooting. The LCD driver 117 controls display of the LCD 118. It should be noted that a function of the digital camera 10 may be selected in accordance with the display of the LCD 118.

The vibration member 121 is arranged on the exterior part of the camera main body 100 as will be described later, and includes a touch detection section 120, and vibration section 119 provided in an area corresponding to the touch detection section. When detecting a touch, the touch detection section 120 outputs a voltage signal. This voltage signal is output to the touch information processing section 125 after being subjected to signal processing by the piezoelectric body control circuit 128. By the series of these input and output operations, the touch state of the touch detection section 120 is determined. Furthermore, a signal output from the piezoelectric body control circuit 128 is input to the vibration section 119 in accordance with information of the operation member setting section 129 set in advance with reference to FIG. 11 to be described later, and the touch state determination of the touch information processing section 125, and the touch detection section 120 vibrates the vibration section 119. By this vibration, the user can acquire the fact that the operation member is touched, and the fact that the function of the touch position is executed as a tactile feeling.

The recording medium 116 records thereon an image obtained by shooting, and information at the time of shooting as an image file. The memory interface (I/F) 115 is an interface for writing/reading data to/from the recording medium 116. The SDRAM 114 primarily stores therein information obtained by shooting such as an image or the like. The bus 110 is a transfer path configured to transfer data or the like in the camera main body 100.

The Bucom 111 is a control section configured to control the operation of the digital camera 10 through the bus 110 or the like. The Bucom 111 carries out communication with the Lucom 208 through the interface (I/F) 126. Further, the Bucom 111 has a function of a setting section configured to set a function corresponding to the touch detected by the touch detection section. Further, the Bucom 111 acquires necessary information from the flash memory 113 to carry out various control operations. The flash memory 113 stores therein various information items necessary for the operation of the digital camera 10.

The operation section 112 is constituted of various operation sections used by the user to operate the camera main body 100 such as a button, dial, and the like including a release button, play button, moving-image button, mode dial, and the like.

The battery 123 is, for example, a secondary battery serving as the power supply of the camera main body 100. The power supply circuit 122 is a circuit having a function or the like of converting the voltage of the battery 123 into a voltage needed by the circuit units of the camera main body 100.

FIG. 2 is a view of a digital camera provided with a plurality of vibration members 121 on the exterior part thereof viewed from the back side. Further, FIG. 3 is a view of the digital camera shown in FIG. 2 viewed from the front side. As shown in FIG. 2, and FIG. 3, touch detection sections 120, and vibration sections 119 constituting the vibration members 121 are arranged at a plurality of positions of the exterior part the camera main body 100. Further, the operation section 112 of the camera main body 100 is a member configured to set functions assigned to the various operation members to the vibration members 121, and includes a mode selection member 112a, operation selection member 112b, and operation determination member 112c. The vibration members 121 may be formed of a transparent material, may be formed on the outside (outer surface side of the camera main body 100) of the LCD 118, and may be arranged so that the LCD 118 can be observed through the vibration members 121. Further, the operation determination member 112c is a member configured to determine the position or the shape or the function or the like of the area of the vibration member 121, and is, for example, a button which outputs signals corresponding to various determinations by being pressed by the user. It should be noted that the operation determination member 112c is not limited to a button, and may be a touch panel or the like.

Figure 6:
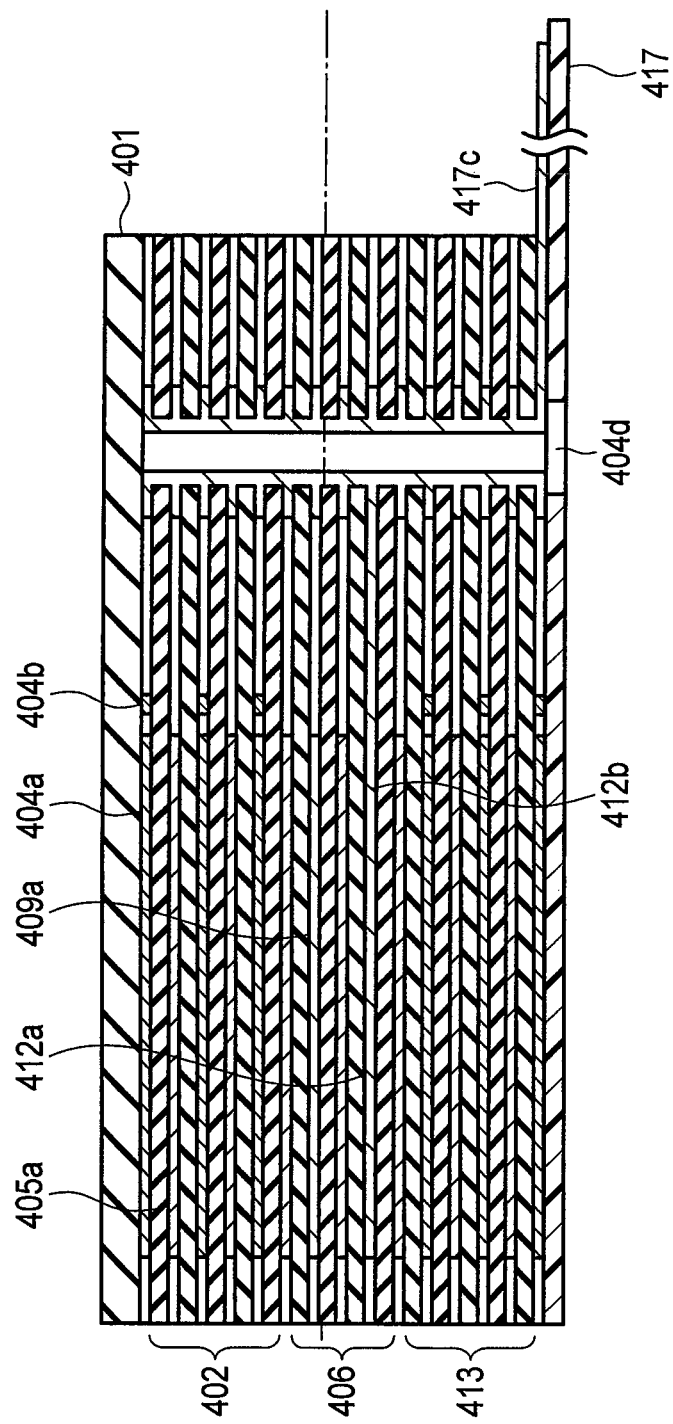
FIG. 6 is a cross-sectional view of the vibration member taken along line B-B of FIG. 5.

FIG. 4A, FIG. 4B, and FIG. 4C are exploded perspective views showing the configuration of the vibration member 121. FIG. 5 is a front view of the vibration member 121. Furthermore, FIG. 6 is a cross-sectional view taken along line B-B of FIG. 5. The vibration member 121 will further be described by using these drawings. It should be noted that the front side of the vibration member 121 is the outer side of the exterior of the camera main body 100.

The vibration member 121 includes a first insulating sheet 401, first drive piezoelectric layer 418, detection layer 406, second drive piezoelectric layer 413, and second insulating sheet 417. These are laminated, as viewed from the surface of the exterior part of the camera main body, in the order of the first insulating sheet 401, first drive piezoelectric layer 418, detection layer 406, second drive piezoelectric layer 413, and second insulating sheet 417. Here, the detection layer 406 mainly functions as the touch detection section 120. Further, the first drive piezoelectric layer 418, and second drive piezoelectric layer 413 mainly function as the vibration section 119.

The first insulating sheet 401 shown in FIG. 4A is a sheet formed of a transparent material having insulating properties such as glass, resin or the like, and is formed on the uppermost surface of the exterior part of the camera main body 100. In the other sheets of the vibration member 121, holes identical to the hole 401a, and hole 401b of the first insulating sheet 401 are formed at positions corresponding to the holes 401a, and 401b. Further, when the vibration member 121 is to be attached to the exterior part of the digital camera 10, the hole 401a, and hole 401b engage with projections on the exterior side to determine the position of the vibration member 121. It should be noted that in this embodiment, no electrode or the like is formed on the first insulating sheet 401, and hence the first insulating sheet 401 may not be positioned with a high degree of accuracy in relation to the other sheets. Accordingly, the hole 401a, and the hole 401b may not necessarily be formed.

The first drive piezoelectric layer 418 is constituted by laminating at least one first vibration sheet 403. The first vibration sheet 403 is constituted of a lamination of a first piezoelectric sheet 404, and second piezoelectric sheet 405.

In the first piezoelectric sheet 404, on a poly-D-lactic acid sheet having piezoelectric properties, electrodes, and the like are formed. Further, the first piezoelectric sheet 404 is divided into a plurality of rectangular areas (in FIG. 4A, five areas from a first area 419a to a fifth area 419e). Further, each of the areas is divided into a plurality of square vibration areas (in FIG. 4A, twelve vibration areas). A signal electrode 404a is formed in each vibration area (in FIG. 4A, signal electrodes 404a are shown in only the first area 419a). A signal line 404b is connected to each of the signal electrodes 404a. Further, the signal line 404b is connected to a signal terminal 417a formed on the second insulating sheet 417 through a through-hole 404c. Here, the signal electrode 404a, and the signal line 404b are formed by, for example, vapor deposition of aluminum, or are formed of an electrically-conductive material such as copper foil or the like. Further, through-holes 404d are formed at a part (in FIG. 4A, an end part on the right side) of the first piezoelectric sheet 404 outside the areas.

Here, in FIG. 4A, the upper six signal electrodes 404a are connected to the upper end part of the first piezoelectric sheet 404, and the lower six signal electrodes 404a are connected to the lower end part of the first piezoelectric sheet 404. By these connections, it is possible to reduce the width of the area necessary for wiring in the x direction to a relatively small width.

In the second piezoelectric sheet 405, on a poly-L-lactic acid sheet having piezoelectric properties, electrodes, and the like are formed. The poly-L-lactic acid sheet will be described later. Further, the second piezoelectric sheet 405 is divided into a plurality of rectangular areas (in FIG. 4A, five areas) as in the case of the first piezoelectric sheet 404. Further, each of these areas is divided into a plurality of square vibration areas (in FIG. 4A, twelve vibration areas). A GND electrode 405a is formed in each of the vibration areas. A GND line 405b is connected to each of the GND electrodes 405a. Further, the GND line 405b is used in common with the first piezoelectric sheet, and second piezoelectric sheet, and is connected to a GND terminal 417d formed on the second insulating sheet 417 through the through-hole 404d. Here, the GND electrode 405a, and the GND line 405b are formed by, for example, vapor deposition of aluminum, or are formed of copper foil or the like.

Here, FIG. 4A shows that one GND electrode 405a is formed for one vibration area. On the other hand, one GND electrode common to the vibration areas may also be formed.

In FIG. 4B, the detection layer 406 is constituted by laminating a first detection sheet 407, and second detection sheet 410. The first detection sheet 407 is constituted by laminating a third piezoelectric sheet 408, and fourth piezoelectric sheet 409. Further, the second detection sheet 410 is constituted by laminating a fifth piezoelectric sheet 411, and sixth piezoelectric sheet 412.

The third piezoelectric sheet 408 is identical to the second piezoelectric sheet 405. Further, the fifth piezoelectric sheet 411 is constituted by forming electrodes and the like on a poly-D-lactic acid sheet in a manner identical to the second piezoelectric sheet 405. The poly-D-lactic acid sheet will be described later.

The fourth piezoelectric sheet 409 is constituted by forming electrodes and the like on a poly-D-lactic acid sheet. Further, the fourth piezoelectric sheet 409 is divided into a plurality of rectangular areas (in FIG. 4B, five areas). Further, in each of the areas, first detection electrodes 409a of a number equal to the number of columns of vibration areas included in each of the areas, and each having an area corresponding to each column of the GND electrodes of the third piezoelectric sheet 408 are formed. A signal line 409*b* is connected to each of the first detection electrodes 409*a*. Further, the signal line 409*b* is connected to a first detection terminal 417*b* formed on the second insulating sheet 417 through the through-hole 404*c*. Here, the first detection electrode 409*a* and the signal line 409*b* are formed by, for example, vapor deposition of aluminum, or are formed of an electrically-conductive material such as copper foil or the like. Further, the through-holes 404*d* are formed at a part (in FIG. 4B, an end part on the right side) of the fourth piezoelectric sheet 409 outside the areas.

The sixth piezoelectric sheet 412 is constituted by forming electrodes and the like on a poly-L-lactic acid sheet. Further, in the sixth piezoelectric sheet 412, second detection electrodes 412*a* of a number equal to the number of rows of vibration areas and each having an area corresponding to each row of the GND electrodes of the fifth piezoelectric sheet 411 are formed. A signal line 412*b* is connected to each of the second detection electrodes 412*a*. Further, the signal lines 412*b* are connected to second detection terminals 417*c* formed on the second insulating sheet 417 through the through-holes 404*d*. Here, the second detection electrodes 412*a* and signal lines 412*b* are formed by, for example, vapor deposition of aluminum, or are formed of an electrically-conductive material such as copper foil or the like.

The second drive piezoelectric layer 413 includes at least one second vibration sheet 414. The second vibration sheet 414 is constituted by laminating a seventh piezoelectric sheet 415 and eighth piezoelectric sheet 416.

The seventh piezoelectric sheet 415 is constituted by forming electrodes and the like on a poly-D-lactic acid sheet in the manner identical to the fifth piezoelectric sheet 411. Further, the eighth piezoelectric sheet 416 is constituted by forming electrodes and the like in the manner identical to the first piezoelectric sheet 404.

The second insulating sheet 417 is a sheet having insulating properties such as glass, resin or the like. Signal electrodes 404*a* are formed on the second insulating sheet 417. The signal electrodes 404*a* are signal electrodes corresponding to the seventh piezoelectric sheet 415 arranged one layer above the second insulating sheet 417. The signal electrodes 404*a* are connected to signal lines 404*b*. The signal lines 404*b* are connected to signal terminals 417*a* formed in each of the end part (in FIG. 4C, each of end parts on the upper and lower side of the second insulating sheet 417) areas. Wiring is extended from the signal terminals 417*a* to the piezoelectric body control circuit 128. Further, one of two first detection terminals 417*b* is formed between the signal terminals 417*a* at each of the upper and lower end parts in each area. As described previously, each of the first detection terminals 417*b* is connected to one of the first detection electrodes 409*a* through the through-hole 404*c*. Further, wiring is extended from each of the first detection terminals 417*b* to the piezoelectric body control circuit 128.

Furthermore, in the end part area (in FIG. 4C, end part on the right side) of the second insulating sheet 417 in which no signal terminals 417*a*, and no first detection terminals 417*b* are formed, second detection terminals 417*c*, and GND terminal 417*d* are formed. As described previously, the second detection terminals 417*c* are connected to the second detection electrodes 412*a* through the through-holes 404*d*. Further, wiring is extended from the second detection terminals 417*c* to the piezoelectric body control circuit. Further, the GND terminal 417*d* is connected to the GND electrodes 405*a* through the through-hole 404*d*. When the vibration member 121 is constituted of the laminated sheets as described above, in each of the sheets, electrodes are formed on only one surface on the same side, and hence back/front determination can be made easily. Accordingly, when these sheets are manufactured, a process of reversing the sheet is eliminated, and manufacturing of the sheets is simplified.

Figure 7:
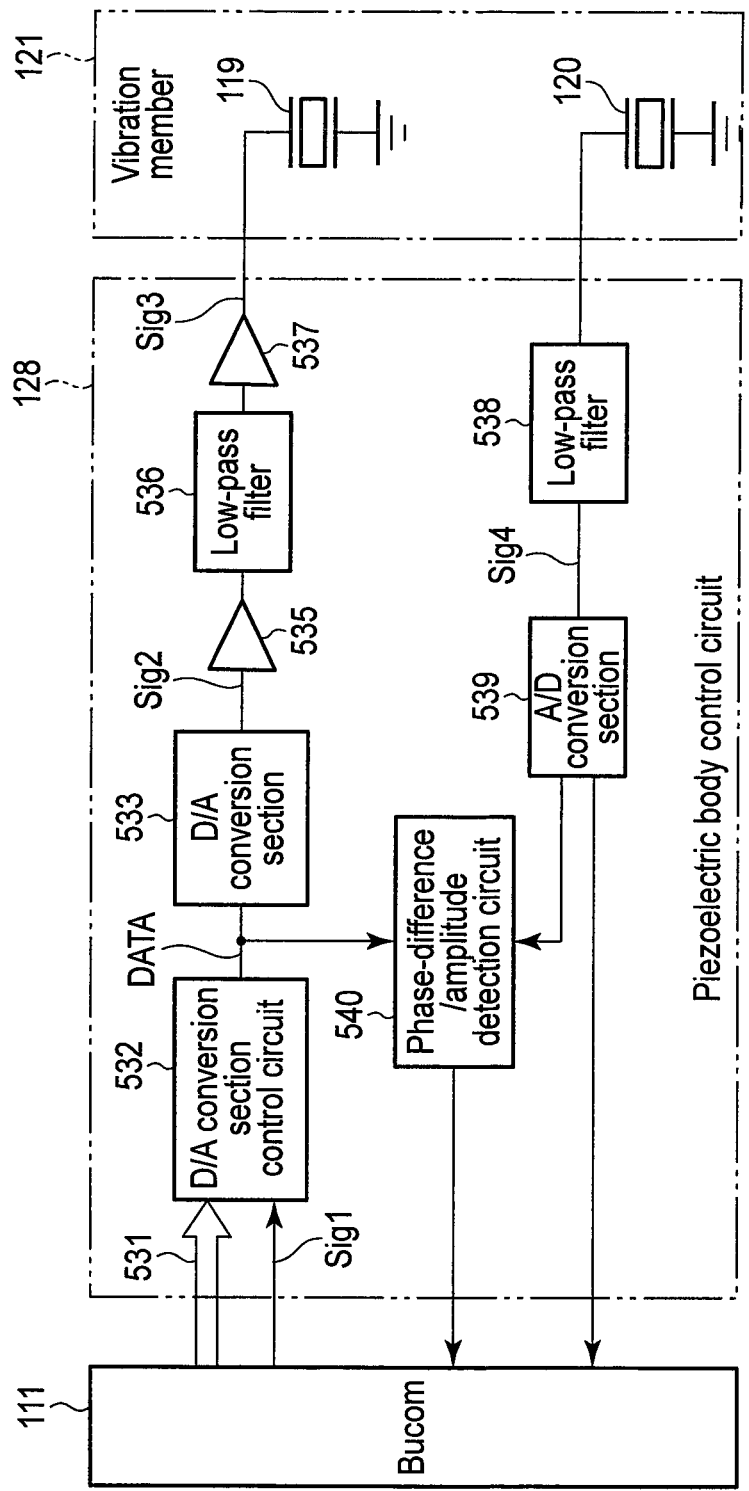
FIG. 7 is a view showing the schematic circuit configuration of a piezoelectric body control circuit.

FIG. 7 is a view showing the schematic circuit configuration of the piezoelectric body control circuit 128. In FIG. 7, the vibration section 119 of an area of the vibration member 121 corresponding to one signal electrode 404*a* and the piezoelectric body control circuit 128 for the touch detection section 120 are shown. The configuration of this piezoelectric body control circuit 128 is identical to that of a piezoelectric body control circuit 128 for the vibration section 119, and touch detection section 120 of the other area, and hence a description of the piezoelectric body control circuit 128 corresponding to the other area is omitted. The part of the piezoelectric body control circuit 128 configured to control the vibration section 119 will be described below first. The piezoelectric body control circuit 128 includes a D/A conversion section control circuit 532, D/A conversion section 533, first amplifier 535, first low-pass filter 536, second amplifier 537, second low-pass filter 538, A/D conversion section 539, and phase-difference/amplitude detection circuit 540.

The D/A conversion section control circuit 532 creates a digital voltage value DATA to be given to the D/A conversion section 533. The D/A conversion section 533 converts the digital voltage value DATA input thereto from the D/A conversion section control circuit 532 into an analog signal. The first amplifier 535 amplifies the analog signal input thereto from the D/A conversion section 533. The first low-pass filter 536 removes a high-frequency component in the analog signal input thereto from the first amplifier 535. The second amplifier 537 amplifies an analog signal input thereto from the first low-pass filter 536, and inputs the amplified analog signal to the vibration section 119 constituted of the first drive piezoelectric layer 418, and second drive piezoelectric layer 413. The vibration section 119 is vibrated by the input analog signal. The second low-pass filter 538 removes a high-frequency component of an analog signal corresponding to the vibration displacement of the vibration member 121 output from the touch detection section 120 constituted of the detection layer 406. The A/D conversion section 539 converts an analog signal input thereto from the second low-pass filter. 538 into a digital signal. The phase-difference/amplitude detection circuit 540 compares the digital voltage value of the A/D conversion section 539, and a digital voltage value input thereto from the D/A conversion section control circuit 532 with each other to thereby detect a phase difference and amplitude difference between the digital voltage values. Furthermore, the Bucom 111 receives the phase difference and amplitude difference, calculates correction values used to correct the phase difference and amplitude difference, and outputs the calculated correction values to the D/A conversion section control circuit 532 as a feedback signal for control of the vibration section 119. In the configuration described above, for example, even when the force of the user touching the vibration section 119 is changed, the vibration section 119 can generate stable vibration.

Next, when the user touches the vibration member 121 to distort the detection layer 406, the touch detection section 120 outputs a voltage signal proportionate to the distortion amount to the corresponding piezoelectric body control circuit 128. In the second low-pass filter 538, a high-frequency component of the voltage signal is removed. In the A/D conversion section 539, conversion from the analog signal into a digital signal is carried out. The Bucom 111 receives the digital signal output from the A/D conversion section 539, and carries out processing such as touch position detection, distribution detection of the touch force amount, and the like together with the touch information processing section 125.

It should be noted that the piezoelectric body control circuit 128 may directly control the D/A conversion section 533. Further, it is sufficient if the first amplifier 535 and the second amplifier 537 are provided as the need arises, and these amplifiers are not essential to the configuration.

Figure 8:
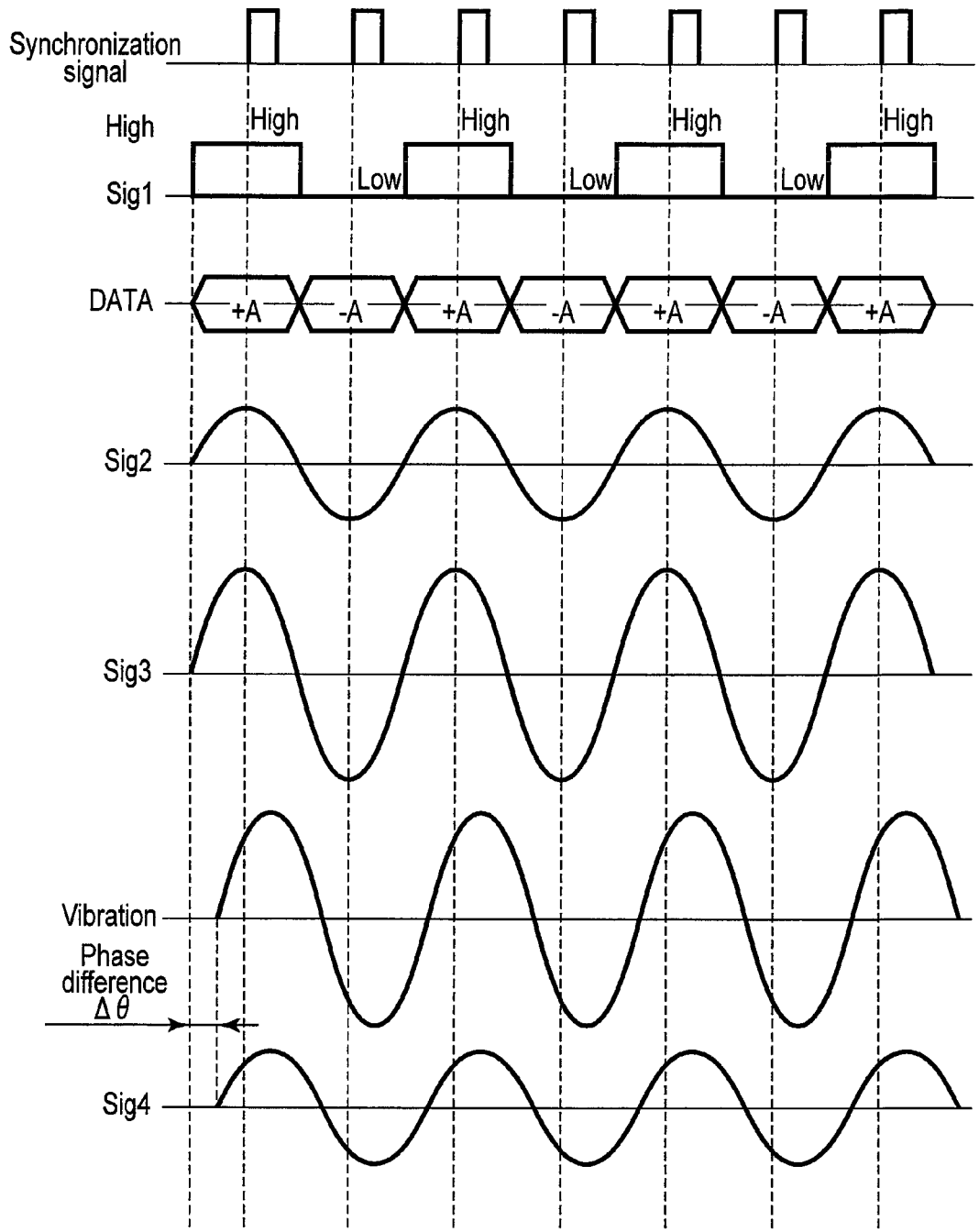
FIG. 8 is a time chart of signals output from the piezoelectric body control circuit.

FIG. 8 is a time chart schematically showing signals output from the piezoelectric body control circuit 128. Operations of the vibration member 121 and piezoelectric body control circuit 128 will be described below by using FIG. 8. First, an operation of the vibration section 119 will be described. When the vibration member 121 is to be vibrated, the Bucom 111 inputs a signal Sig1 in which a phase difference Δθ is corrected on the basis of a synchronization signal of imaging to the D/A conversion section control circuit 532 by way of the bus 110. When the input signal Sig1 is at the high level, the D/A conversion section control circuit 532 outputs a positive digital voltage value +A to the D/A conversion section 533 as the digital voltage value DATA and, when the signal Sig1 is at the low level, the D/A conversion section control circuit 532 outputs a negative digital voltage value −A to the D/A conversion section 533 as the digital voltage value DATA. Here, the variable A is an amplitude value of the drive signal, and is a value prescribed by the Bucom 111. Further, the variable A may be a function of time and, more specifically, the variable A may be data expressing a waveform such as a rectangular wave, triangular wave, trapezoidal wave, and the like having a predetermined amplitude.

The D/A conversion section 533 converts the digital voltage value input thereto into a signal Sig2, and outputs the signal Sig2 to the first amplifier 535. The first amplifier 535 amplifies the signal Sig2, and outputs the amplified signal Sig2 to the first low-pass filter 536. The first low-pass filter 536 removes a high-frequency component from the amplified signal Sig2, and outputs a pseudo-sinusoidal wave. The second amplifier 537 amplifies the signal input thereto from the first low-pass filter 536, and outputs a drive signal Sig3 obtained as a result of the amplification to a corresponding signal terminal 417*a* of the vibration member 121. Here, the signal terminal 417*a* is, for example, a signal terminal 417*a* corresponding to a vibration area currently touched by the user. The drive signal Sig3 input to the signal terminal 417*a* is applied to a corresponding signal electrode 404*a*. Further, when the user touches the vibration member 121, the vibration amplitude and the phase generated at the signal terminal 417*a* change according to the strength of the touch. The amplitude and the phase are detected by feeding back the touch information to the signal from the detection layer 406, and data of the D/A conversion section control circuit 532 is controlled according to the amplitude and phase difference, whereby it is possible to give a constant feeling of vibration to the user irrespective of the strength of touch. Furthermore, by the piezoelectric effect, a voltage signal corresponding to the strength of touch is generated from the detection layer 406. This voltage signal is finally output from the A/D conversion section 539 to the Bucom 111, and the signal makes it possible to detect the touch position and strength of touch.

FIGS. 9A to 9E are views for explaining a poly-L-lactic acid sheet and poly-D-lactic acid sheet. The poly-L-lactic acid sheet and poly-D-lactic acid sheet have an inverse piezoelectric property in such a manner that when one of them stretches by application of a voltage, the other of them contracts. As shown in, for example, FIG. 9A, when a positive voltage is applied to the poly-D-lactic acid sheet, the poly-D-lactic acid sheet is displaced to be stretched and, when a negative voltage is applied thereto as shown in FIG. 9B, the poly-D-lactic acid sheet is displaced to be contracted. On the other hand, as shown in FIG. 9C, the poly-L-lactic acid sheet is displaced to be stretched by application of a negative voltage and, as shown in FIG. 9D, the poly-L-lactic acid sheet is displaced to be contracted by application of a positive voltage. As shown in FIG. 9E, the first drive piezoelectric layer 418 has the configuration in which a poly-L-lactic acid sheet (second piezoelectric sheet 405) and a poly-D-lactic acid sheet (first piezoelectric sheet 404) are stacked in order, and hence when a positive voltage is applied thereto, the layer 418 is displaced to be stretched as a whole and, when a negative voltage is applied thereto, the layer 418 is displaced to be contracted as a whole. Further, the second drive piezoelectric layer 413 also has the configuration in which a poly-L-lactic acid sheet (second piezoelectric sheet 405) and a poly-D-lactic acid sheet (first piezoelectric sheet 404) are stacked in order. However, the second drive piezoelectric layer 413 is displaced in a direction opposite to the first drive piezoelectric layer 418 depending on the way of forming the signal electrode 404*a* and GND electrode 405*a* in the second drive piezoelectric layer 413. For this reason, when a positive voltage is applied to the vibration member 121, the whole vibration member 121 is bent and deformed in such a manner that the member 121 is upwardly swelled in the drawing (FIG. 6 shows a neutral axis of such flexion deformation). On the other hand, when a negative voltage is applied to the vibration member 121, the member 121 is bent and deformed in such a manner that the member 121 becomes upwardly concave in the drawing. Further, by changing the sign of the voltage to be applied to the signal electrode 404*a* in terms of time, the vibration member 121 vibrates.

The stretch and contraction of the detection layer 406 occur concomitantly with the vibration of the vibration member 121. At this time, a voltage is generated in the detection layer 406 according to the degree of the stretch and contraction by the piezoelectric effect. This voltage is input to the second low-pass filter 538 of the piezoelectric body control circuit 128 through the second detection terminal 417*c* (or the first detection terminal 417*b*). The second low-pass filter 538 removes a high-frequency component of an analog voltage signal generated according to the vibration of the vibration member 121, and outputs a signal Sig4 obtained by the removal of the high-frequency component to the A/D conversion section 539. The A/D conversion section 539 captures the signal Sig4, and converts the signal Sig4 into digital data. The phase-difference/amplitude detection circuit 540 detects a phase difference Δθ and amplitude difference Δp between the signal Sig2 and signal Sig4 as digital values on the basis of the digital data input thereto from the A/D conversion section 539. The Bucom 111 carries out phase adjustment and amplitude adjustment of the signal Sig1 according to the phase difference Δθ. It is possible to vibrate the vibration member 121 with a desired phase and amplitude by such feedback control.

Next, an operation of the touch detection section 120 will be described below. When the user carries out a touch on a predetermined area of the vibration member 121, the vibration member 121 is stretched and contracted by the touch. As described previously, a voltage corresponding to the stretch and contraction of the detection layer 406 is generated. This voltage signal is converted into a digital signal by the second low-pass filter 538 and A/D conversion section 539, and is input to the Bucom 111. The Bucom 111 determines in which area the touch has been carried out from a voltage output from the first detection terminal 417*b*, and voltage output from the second detection terminal 417*c*. That is, a touch position in the column direction can be detected from the output of the first detection terminal 417*b*. On the other hand, a touch position in the row direction can be detected from the output of the second detection terminal 417*c*. When multipoint touches can be detected, it is sufficient if the electrode structure of each of the fourth piezoelectric sheet 409 and sixth piezoelectric sheet 412 is similar to the electrode structure of the first piezoelectric sheet 404 provided for each area.

Figure 10A:
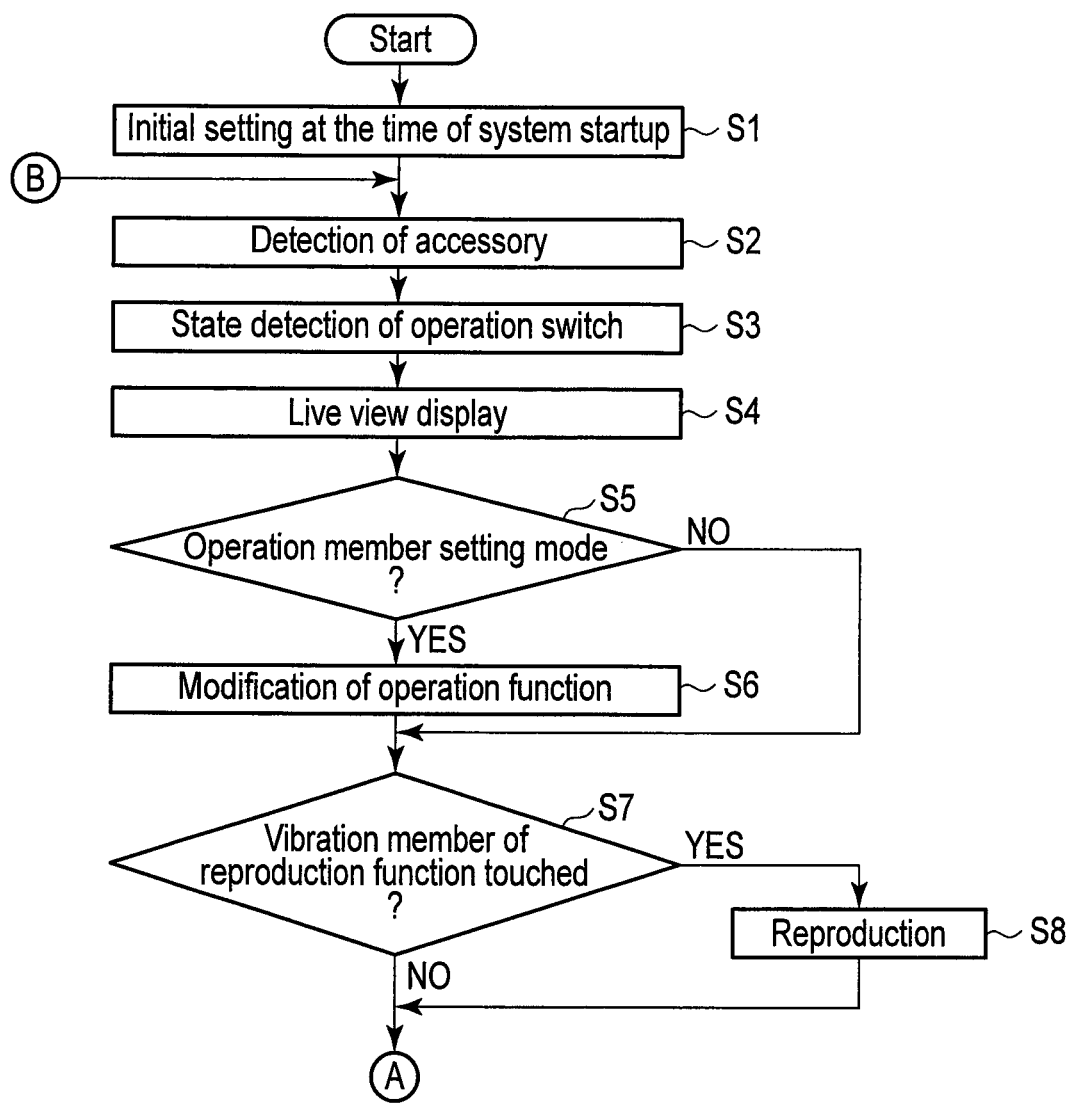
FIGS. 10A and 10B are flowcharts showing an operation example of an operation-member setting mode.
Figure 10B:
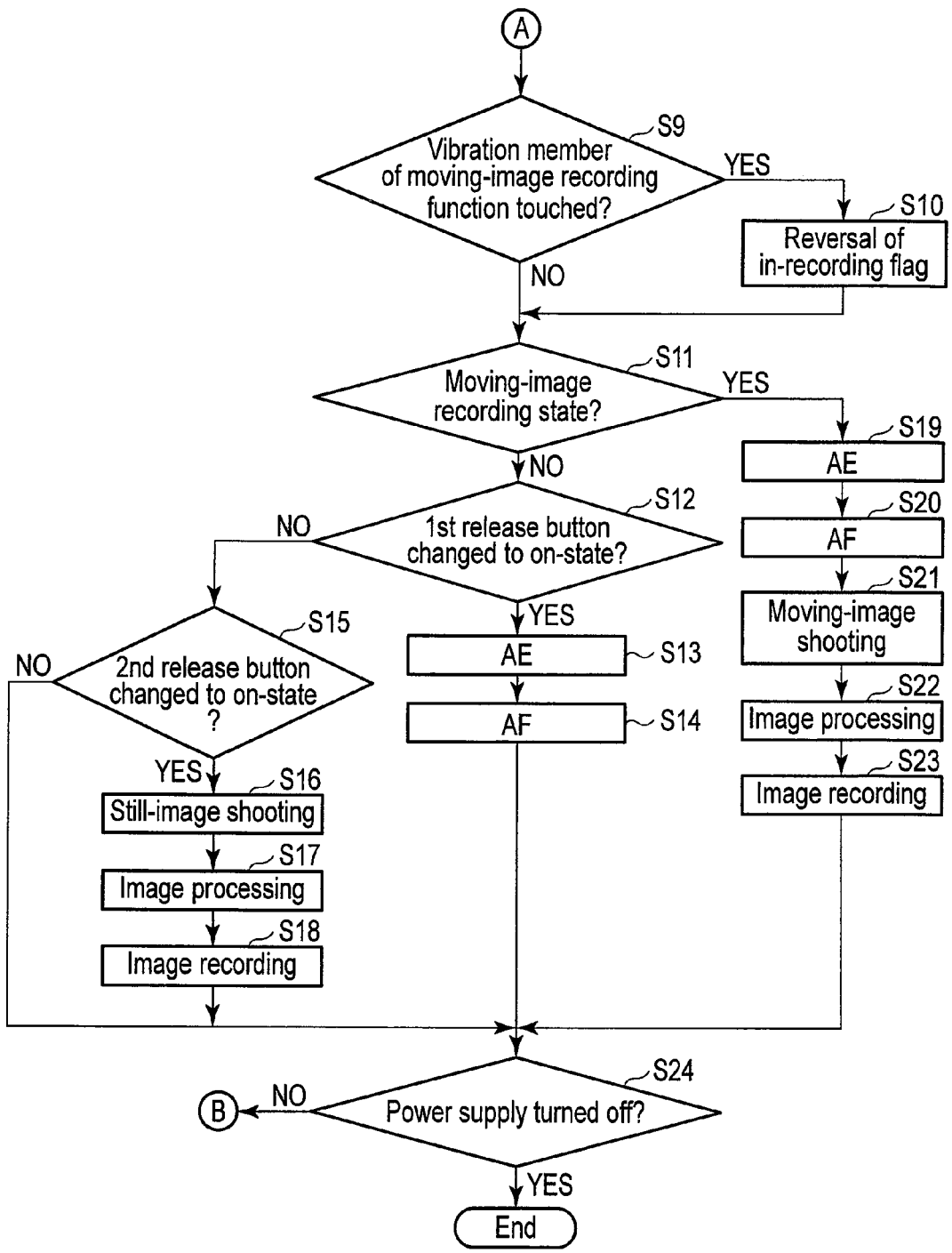

FIGS. 10A and 10B are flowcharts showing the main operation of the digital camera 10 according to this embodiment. The operation of the digital camera 10 according to this embodiment will be described below by using FIGS. 10A and 10B.

When the user operates a power supply switch included in the operation section 112, the power of the digital camera 10 is turned on. At this time, processing of the main flow shown in FIGS. 10A and 10B are started.

The Bucom 111 executes initialization processing at the time of system startup of the digital camera 10 (step S1). In step S1, for example, processing of making an in-recording flag off (initializing) is carried out. The in-recording flag is a flag indicating whether or not a moving image is being recorded. That the in-recording flag is on implies that a moving image is being recorded. On the other hand, that the in-recording flag is off implies that no moving image is being recorded.

After the initialization processing at the time of startup of the system is carried out in step S1, the Bucom 111 carries out detection of an accessory connected to the camera main body 100, such as an interchangeable lens 200 or the like (step S2). Subsequently, the Bucom 111 carries out detection of the state of the operation member setting section 129 such as the play button or the like, and detection of a function set to the vibration member 121 (step S3).

Subsequently, the Bucom 111 controls each section to cause live view display to be executed (step S4). The Bucom 111 causes the imaging element 103 to execute imaging for live view display. Further, the Bucom 111 causes the image processing section 106 to subject the signal obtained by imaging to image processing for the purpose of live view display. Thereafter, the Bucom 111 inputs image data obtained by the image processing to the LCD driver 117 to cause the LCD driver to execute live view display on the LCD 118.

Subsequently, the Bucom 111 determines whether or not the operation member setting mode is set (step S5). The operation member setting mode is set by the user by operating the mode selection member 112*a* of the operation section 112.

When step S5 is branched into YES, i.e., when it is determined that the operation member setting mode is set, the Bucom 111 carries out processing for assigning a function corresponding to the vibration member 121 thereto (step S6). Details of this processing will be described later by using FIG. 11, and FIG. 12.

In step S6, the Bucom 111 assigns one of the functions of a play button, moving-image button, and release button to the vibration member 121.

First, in step S7, the Bucom 111 determines whether or not a physical play button has been turned on or whether or not the vibration member 121 set to the function (reproduction function of image data) of the play button has been touched. It should be noted that when the vibration member 121 is not assigned to the play button in step S6, determination about whether or not the vibration member 121 serving as the function of the play button has been touched is not carried out. Further, also when the vibration member 121 is not assigned to the moving-image button or the release button, determination about whether or not the vibration member 121 serving as the function of the moving-image button or the release button has been touched is not carried out.

When the processing is branched into NO in step S7, the Bucom 111 determines in step S9 whether or not a physical moving-image button has been turned on or whether or not the vibration member 121 assigned to the function of the moving-image button has been touched.

This physical moving-image button or the vibration member 121 corresponding to the function of the moving-image button has a switch function of alternately repeating an instruction to start moving-image shooting, and instruction to end the shooting each time the button or the member 121 is pressed.

When the processing is branched into NO in step S9, the Bucom 111 determines in step S11 whether or not a moving image is being recorded.

When the processing is branched into NO in step S11, the Bucom 111 determines whether or not a physical release button has been turned on or whether or not the vibration member 121 assigned to the function of the release button has been touched.

On the other hand, when the processing is branched into NO in step S5, the Bucom 111 skips the processing of step S6. That is, when there is a function hitherto set to the vibration member 121, the function is used and, when there is no function set to the vibration member 121, the operation is carried out by using an operation signal from a physical button.

When the vibration member 121 to which the function of the play button is set is pressed, i.e., when the processing branches step S7 into YES, the Bucom 111 carries out reproduction (step S8). For example, the Bucom 111 reads an image file from the recording medium 116 to input the image file data to the image-compression/expansion section 109, and causes the image-compression/expansion section 109 to execute expansion of the image data. After that, the Bucom 111 inputs the expanded image data to the LCD driver 117 and causes the driver 117 to execute reproduction of the image on the LCD 118. After that, when it is determined that the vibration member 121 set to the function of the play button has been pressed again by the user, the reproduction processing is terminated.

Further, after the reproduction processing is executed or when the processing branches step S7 into NO (when the vibration member 121 serving as the play button has not been pressed or when the physical play button has not been pressed), the Bucom 111 determines, as described above, whether or not the vibration member 121 set to the function of the moving-image button has been pressed (step S9).

When the processing branches step S9 into YES, i.e., when it is determined that the vibration member 121 set to the function of the moving-image button has been pressed or the physical moving-image button has been pressed, the Bucom 111 reverses the in-recording flag (step S10). Here, in step S10, the Bucom 111 reverses the off-state or the on-state of the in-recording flag.

After the in-recording flag is reversed in step S10 or when the processing branches step S9 into NO, i.e., when the vibration member 121 set to the function of the moving-image button has not been pressed or the physical moving-image button has not been pressed, the Bucom 111 determines whether or not moving-image shooting is continuously carried out (step S11). When the in-recording flag is on, moving-image recording is being carried out, and hence in this example, it is determined whether or not moving-image recording is being carried out on the basis of whether or not the in-recording flag is on.

When the processing branches step S11 into NO, i.e., when it is determined that moving-image recording is not being carried out, the Bucom 111 determines whether or not the vibration member 121 set to the function of the release button has been half-pressed or the physical release button has been half-pressed, i.e., whether or not the first release button has been brought to the on-state from the off-state (step S12). Accordingly, for example, when the on-state of the first release button is maintained, the processing branches step S12 into NO. Here, when the vibration member 121 is set to the function of the release button, the Bucom 111 distinguishes the first release from the second release on the basis of the strength of the pressing force on the vibration member 121.

When the processing branches step S12 into YES, i.e., when the first release button has been changed from the off-state to the on-state, the Bucom 111 carries out AE processing (step S13).

The Bucom 111 executes imaging for the purpose of the AE processing. This imaging is imaging intended for AE, and an image acquired by the imaging for the AE processing is not recorded on the recording medium 116. After carrying out the imaging for the AE processing, the Bucom 111 determines exposure control values to be used in shooting, such as an aperture value, shutter speed, and the like, and determines a control value for displaying the live view of the LCD 118 with appropriate exposure.

Subsequently, the Bucom 111 executes AF processing (step S14). The Bucom 111 instructs the Lucom 208 to drive the focus lens 202 for the AF processing. Further, concomitantly with the drive of the focus lens 202, the Bucom 111 evaluates the contrast to be calculated in the AF processing section 108 from image data acquired through the imaging element 103, and detects the in-focus position. The in-focus position is a position of the focus lens 202 at which the contrast is optimized.

When the processing branches step S12 into NO, i.e., when it is determined that the first release button does not make an off-to-on transition, the Bucom 111 determines whether or not the vibration member 121 serving as the release button has been fully pressed, i.e., whether or not the second release button has been changed from the off-state to the on-state (step S15).

When the processing branches step S15 into YES, i.e., when it is determined whether or not the second release button has been brought to the on-state, the Bucom 111 executes still-image shooting processing (step S16). That is, the Bucom 111 carries out an opening/closing operation of the shutter 101 according to the exposure control values determined by the AE processing in step S13, carries out imaging by using the imaging element 103, and acquires an image signal corresponding to the optical image of the object.

After executing the still-image shooting processing, the Bucom 111 causes the image processing section 106 to execute image processing for the image data obtained through the imaging element 103 (step S17). Further, the Bucom 111 causes the image-compression/expansion section 109 to subject the image data which has been subjected to the image processing to compression processing, and records the image data subjected to the compression processing on the recording medium 116 as an image file of the still image (step S18).

When the processing branches step S11 into YES, i.e., when it is determined that the moving image is being recorded, the Bucom 111 executes AE processing (step S19). The AE processing to be executed in step S19 is processing identical to the AE processing in step S13. Subsequently, the Bucom 111 executes AF processing (step S20). The AF processing to be executed in step S20 is processing identical to the AF processing in step S14. After executing the AF processing, the Bucom 111 executes moving-image shooting (step S21). Here, the Bucom 111 executes imaging by using the imaging element 103 according to the exposure control values determined by the AE processing in step S19. Thereafter, the Bucom 111 causes the image processing section 106 to execute image processing for the image data obtained through the imaging element 103 (step S22). Further, the Bucom 111 causes the image-compression/expansion section 109 to subject the image data which has been subjected to image processing to compression processing, and records the image data subjected to the compression processing on the recording medium 116 as an image file of the moving image (step S23). After the image file of the moving image has been created once, compressed image data is added in sequence to the previously created image file until the moving-image shooting is terminated.

When the AF processing in step S14 has been completed, if the vibration member 121 set to the function of the release button has not been pressed or the physical release button has not been pressed, i.e., if it is determined in step S18 to be described later or in step S23 to be described later that recording of moving-image data has been completed, the Bucom 111 determines whether or not the power supply switch of the operation section 112 is rendered off (step S24). Here, when the power supply switch is set to the vibration member 121, an operation of the vibration member 121 to be described later is carried out. It should be noted that when the power supply switch is set to the vibration member 121, a circuit configuration configured to start the touch detection section 120 of the vibration member 121 is required even when the power supply switch is not turned on. In the camera main body 100, the vibration member 121 can use a voltage generated at the time of pressing (a touch) as a voltage necessary for startup of the circuit of the camera main body 100.

When it is determined by the Bucom 111 that the power supply switch is not rendered off, i.e., when step S24 is branched into NO, the Bucom 111 shifts the processing to step S2. When the processing branches step S24 into YES, i.e., when it is determined that the vibration member 121 functioning as the power supply switch is rendered off, the Bucom 111 terminates the processing of FIGS. 10A and 10B. It should be noted that in each of the processing items according to the flowcharts of FIGS. 10A and 10B, even when an operation is detected from the play button, moving-image button, release button, and the like constituting the operation section 112, processing identical to the processing shown in the flowcharts of FIGS. 10A and 10B are carried out.

Figure 11:
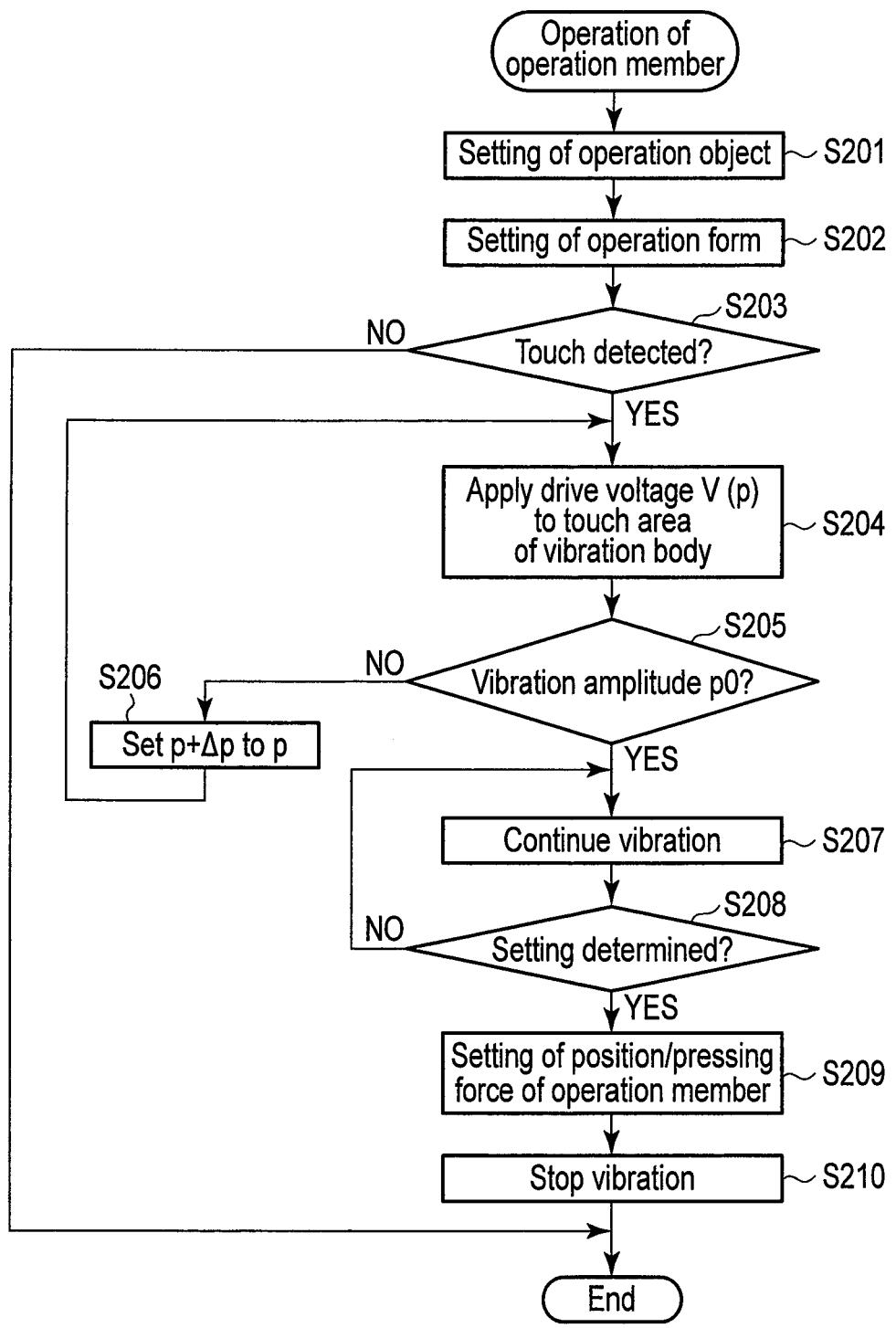
FIG. 11 is a flowchart exemplifying operations of various operation members to which the operation member setting mode is set.

FIG. 11 is a flowchart showing an operation of the set operation member. After it is determined that the operation member setting mode is set by the user by using the mode selection member 112a in step S5 of FIG. 10A, the operation member is set in step S6. That is, the operation selection member 112b is operated, then reproduction, moving-image shooting, and the release operation of image data are selected as functions (operation objects) to be assigned to the vibration member 121; thereafter, a touch (pressing) on the operation determination member 112c is detected, and a corresponding operation object is set to the vibration member 121 (step S201). It should be noted that the operation objects to be set to the vibration member 121 are not limited to these operation objects, and an aperture value changing operation, shutter-speed changing operation, WB (white balance), and the like may be set to the vibration member 121. It should be noted that the digital camera 10 may be designed in such a manner that the operation object to be assigned to the vibration member 121 such as the release function or the like can be selected and determined in a blind state. Likewise, the user operates the operation selection member 112b, and operation determination member 112c to select the form of the operation member such as the type, shape, and size of a dial, button, and the like, and the Bucom 111 sets an operation form for giving an operational feeling to the user (step S202). It should be noted that the order of the step of setting of the operation object and the step of setting of the form of the operation member may be reversed. Further, setting of the operation object or setting of the form of the operation member is configured in such a manner that the operation objects, and the examples of the form are displayed on the LCD 118, whereby the user can select an operation object and form of the operation member. Next, the Bucom 111 determines whether or not a predetermined touch on the vibration member 121 has been carried out by the user from an output signal from the vibration member 121, i.e., from an output signal from the detection layer 406 (step S203). When step S203 is branched into NO, i.e., when it is determined that a predetermined touch has not been carried out by the user, the processing is terminated. It should be noted that the predetermined touch securely reflects the intention of the user in such a manner that the predetermined touch that takes place on a predetermined area with a predetermined pressing force or more or in such a manner that the predetermined touch takes place for a predetermined time or more or with predetermined pressing force or more.

On the other hand, when step S203 is branched into YES (when a touch takes place), the Bucom 111 applies a frequency wave voltage V (p) to the vibration section 119 corresponding to the touch position to thereby vibrate the vibration section 119 (step S204).

The generated vibration is output by the touch detection section 120 as a frequency wave voltage. The Bucom 111 determines whether or not the frequency wave voltage has a vibration amplitude p0 set by the piezoelectric body control circuit 128 as the operation object and operation form (step S205). When the determination result in step S205 is NO, i.e., when the vibration amplitude of the frequency wave voltage is not the vibration amplitude p0, the Bucom 111 sets p+Δp to the vibration amplitude value p (step S206). After this, the processing returns to step S204. At this time, a vibration voltage V (p+Δp) is output from the piezoelectric body control circuit 128 (step S204).

On the other hand, when the vibration amplitude is the set vibration amplitude in step S205 (YES in step S205), the vibration of the vibration section 119 is continuously generated (step S207). Subsequently, the Bucom 111 determines whether or not the operation determination member 112c has been pressed by the user (step S208). When the determination result in step S208 is NO, the processing returns to step S207, and the vibration of the vibration section 119 is continued. In this case, when the continuance of the vibration becomes longer than or equal to a predetermined time, the vibration section 119 may stop the vibration thereof after the vibration as a warning. On the other hand, when the determination result in step S208 is YES, the Bucom 111 sets a vibration member 121 conforming to the setting of the operation object and operation form to a position on the touch detection section 120 at which a touch has been detected in step S203 (step S209), and makes the vibration section 119 stop the vibration thereof (step S210). Thus, a series of flows of setting of the operation member to the vibration member 121 terminates. It should be noted that the position of the vibration member 121 may be any one of positions on the exterior part of the digital camera 10. For example, the position of the vibration member 121 is not limited to the exterior part of the camera main body 100, and may be a position on the exterior part of the interchangeable lens 200. Further, the above-mentioned operation example is merely an example, and an operation example in which at least one of setting of the operation object (function), and setting of the position of the vibration member 121 is selected by the user may also be employed. For example, assuming that the position of the operation member is fixed, only setting of the operation object may be carried out by the user. When only the operation object is set, setting of the vibration member 121, setting of the operation form, and so on are carried out by the Bucom 111 without determination of selection by the user. However, when only setting of the operation object is selected by the user, it is necessary that the position of the vibration member 121 or the form of the vibration member 121 should be set by the Bucom 111.

Figure 12:
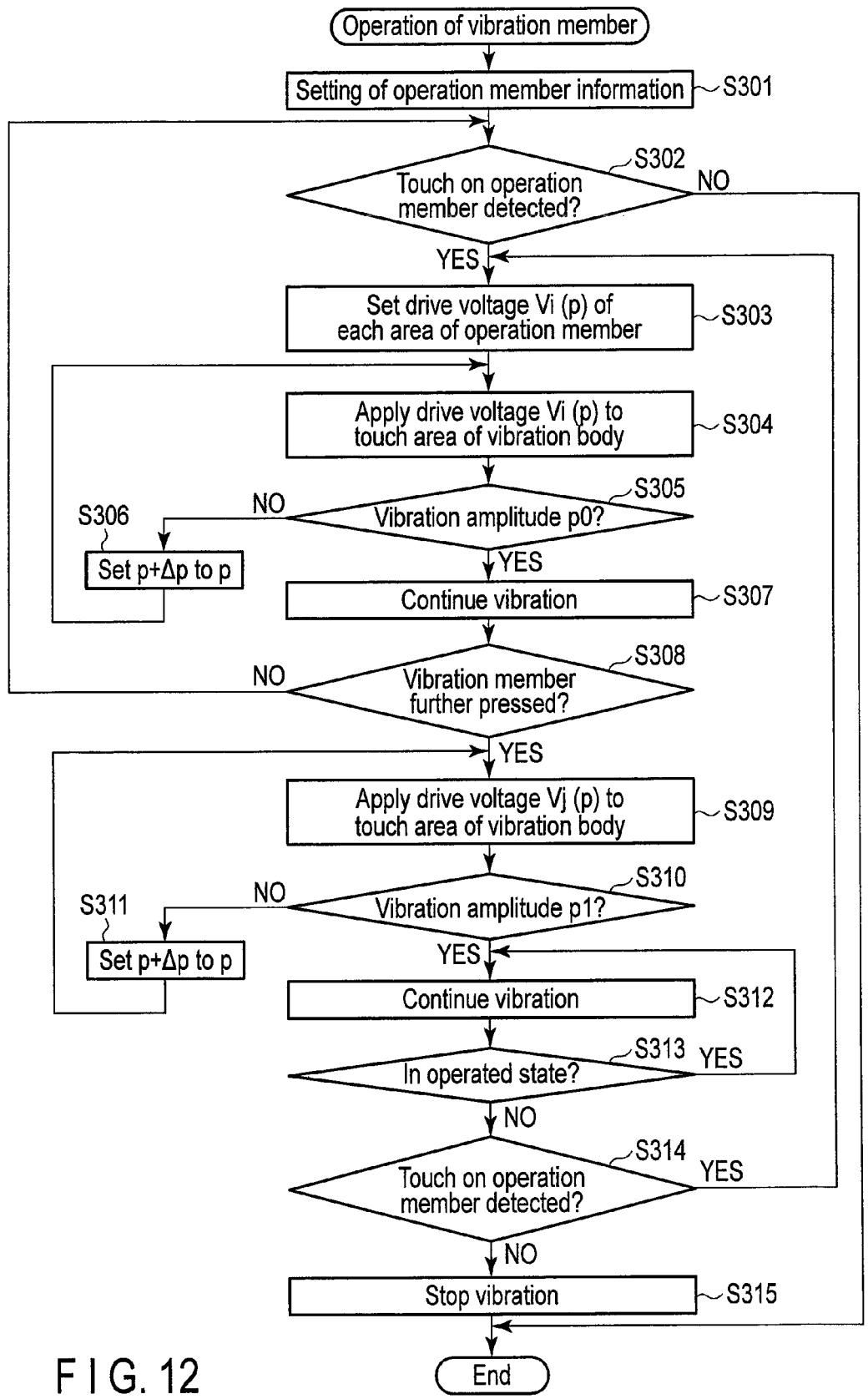
FIG. 12 is a flowchart showing an operation example of the vibration member.

FIG. 12 shows an operation of the vibration member 121 set by the flowchart of FIG. 11. The Bucom 111 sets operation member information such as a criterion for determination of a touch on the operation member set to the vibration member 121, a criterion for determination of an operation, or the like each time the Bucom 111 carries out state detection (step S3) of the operation section of FIG. 10A (step S301). Next, the Bucom 111 determines whether or not a touch takes place on a set operation member of the vibration member 121 according to the criterion for determination of a touch included in the operation member information (step S302). On the other hand, when it is determined that no touch takes place on the operation member of the vibration member 121, i.e., when the determination result is NO, the operation flow of the operation member is terminated.

When a touch on the operation member is detected in step S302 (YES in step S302), the Bucom 111 sets the drive voltage Vi (p) of each of areas of the operation member (step S303). Here, a subscript i of the drive voltage Vi (p) is an integer indicating the number of each area of the operation member. Next, the Bucom 111 applies the drive voltage Vi (p) to each set area of the vibration member 121 (step S304). A vibration amplitude of each area is detected by the touch detection section 120 as a voltage, and the voltage is input to the Bucom 111 through the piezoelectric body control circuit 128. The Bucom 111 determines whether or not the amplitude of the voltage detected by the touch detection section 120 is the set vibration amplitude p0 (step S305). When the determination result is NO in step S305, the Bucom 111 sets p+Δp to the vibration amplitude value p, then applies the drive voltage Vi (p+Δp) corresponding to the set amplitude p+Δp to each set area of the vibration member 121, and thereafter the processing returns to step S304 (step S306). On the other hand, when the determination result is YES in step S305, the Bucom 111 continues the vibration of the areas of the vibration member 121 (step S307). When determination of the phase is to be carried out in step S305, adjustment of the phase is also carried out in step S306. When the phase is adjusted in each area, it becomes possible to change the occurrence position of the maximum amplitude of vibration, and make the center position of the operation member coincide with the center position of the touch position.

Next, the Bucom 111 determines whether or not the vibration member 121 has been operated. That is, it is determined whether or not the vibration member 121 has been squeezed or whether or not the position of pressing has been moved. This determination is made by detecting the pressing force by means of the touch detection section 120 as a voltage, and inputting the detected voltage to the Bucom 111 through the piezoelectric body control circuit 128 (step S308). When the vibration member 121 is not operated in step S308, i.e., when the determination result in step S308 is NO, the processing returns to step S302. On the other hand, when the determination result in step S308 is YES, the Bucom 111 applies a drive voltage Vj (p) to the vibration section 119 to make the vibration section 119 vibrate (step S309). Next, the Bucom 111 detects vibration of the areas of the operation member from the voltage signal of the touch detection section 120 through the piezoelectric body control circuit 128, and determines whether or not the detected result is a voltage signal corresponding to the vibration amplitude p1 set at the time of setting of the operation member (step S310). When the determination result in step S310 is NO, the Bucom 111 sets the vibration amplitude value p to p+Δp (step S311). The Bucom 111 returns to step S309, and applies a drive voltage Vj (p+Δp) corresponding to the vibration amplitude value p+Δp to the vibration section 119 to make the vibration section 119 vibrate. On the other hand, when the determination result in step S310 is YES, the vibration is continued (step S312). Subsequently, the Bucom 111 determines whether or not the operation member is in an operated state where the operation member is currently operated through the piezoelectric body control circuit 128 according to the output of the touch detection section 120 of the area of the operation member (step S313). When the determination result in step S313 is YES, the processing returns to step S312, i.e., the vibration of the vibration section 119 is continued. On the other hand, when the determination result in step S313 is NO, the Bucom 111 determines whether or not a touch takes place on the area of the vibration member 121 from the output of the touch detection section 120 (step S314). When it is determined that a touch takes place on the area, i.e., when the determination result is YES, the processing returns to step S303. On the other hand, when it is determined that no touch takes place on the area, i.e., when the determination result is NO, the Bucom 111 stops the vibration of the vibration member 121 (step S315). Thereafter, the processing is terminated.

Figure 13A:
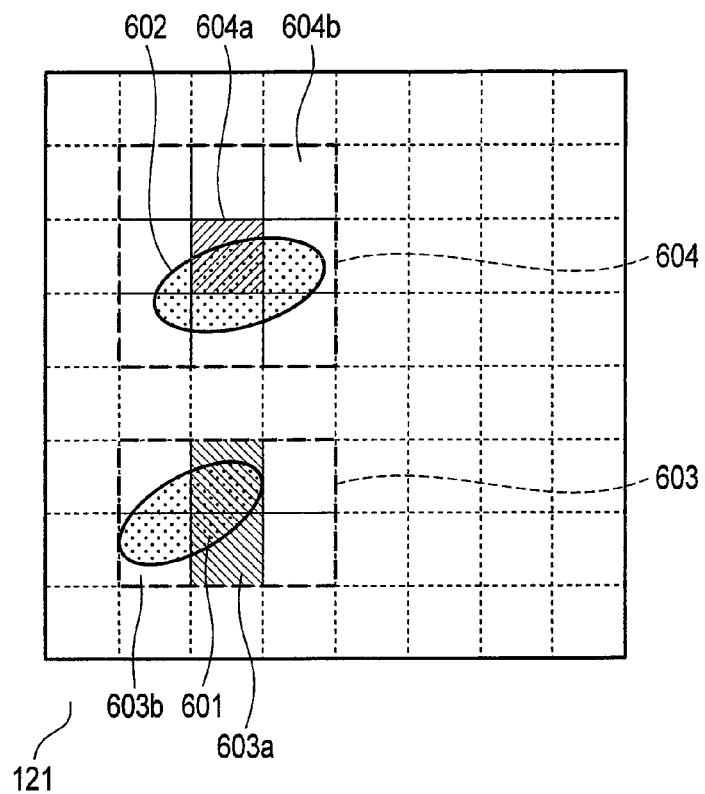
FIG. 13A is a view showing areas which vibrate by pressing various operation members.
Figure 13B:
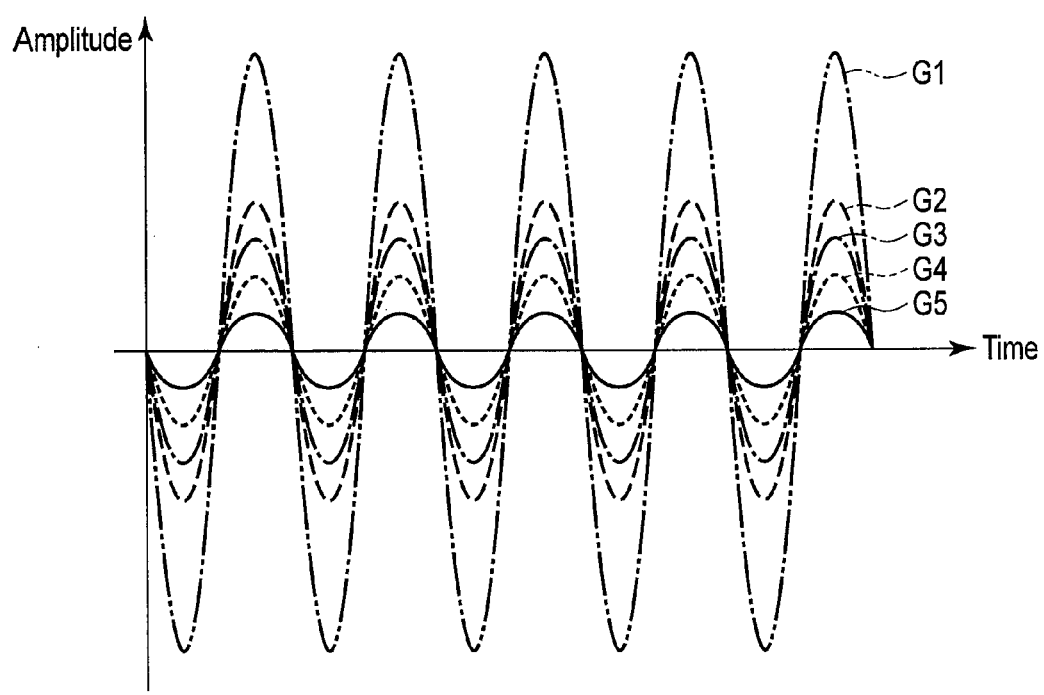
FIG. 13B is a view showing an example of a vibration amplitude of each area.
Figure 14:
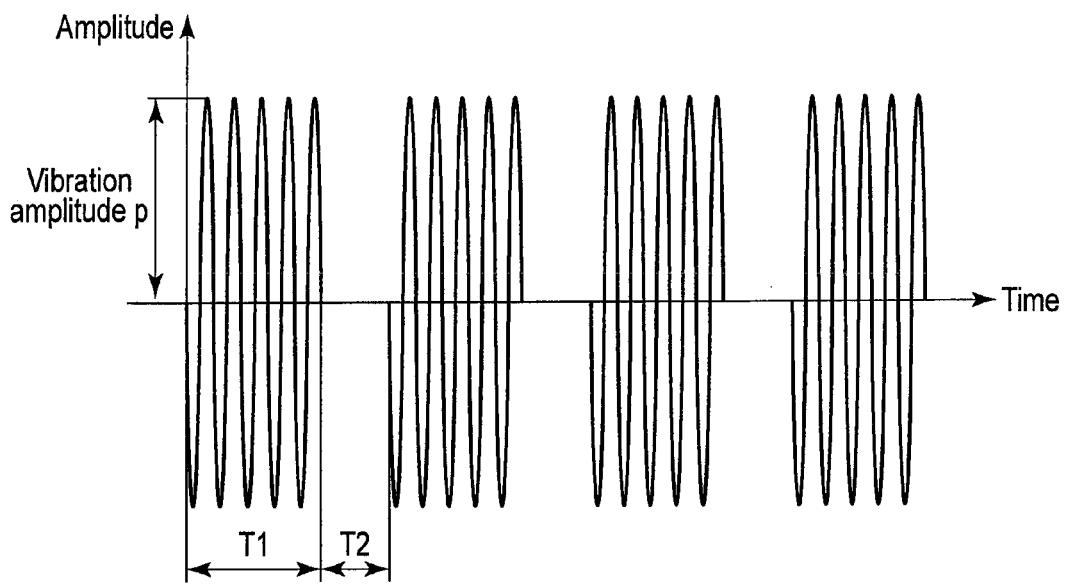
FIG. 14 is a schematic view of burst vibration which is an example of vibration of the vibration member.

FIG. 13A, and FIG. 13B show the situation of vibration of a case where a vibration member A 603 and a vibration member B 604 set to the vibration member 121 are touched. In FIG. 13A, a voltage corresponding to the pressing force of a touch is detected from the touch detection section 120 of each area. A touched area in the operation member A 603 is referred to as a touch area 601, and a touched area in the operation member B 604 is referred to as a touch area 602. When a touch is detected from a detection voltage of each area of the touch detection section 120 constituting each operation member, the piezoelectric body control circuit 128 applies a voltage to the vibration section 119 of the vibration member 121. Each area to which a voltage has been applied vibrates with a predetermined vibration amplitude. In this embodiment, the magnitude of the vibration amplitude is set in such a manner that the magnitude differs from area to area, and the vibration amplitude of the diagonally shaded area 604a in the central part of the operation member B 604 is set larger than the vibration amplitude of the area 604b. The same applies to the vibration amplitude of the area 603a in relation to the area 603b. When the vibration amplitude of the central part of each operation member is made larger as described above, the user can perceive the position of the central part of each operation member by a tactile feeling. Further, by changing the form of each operation member, distinction between the operation members is enabled by a tactile feeling. Further, by making the vibration amplitude of the operation member A larger than the vibration amplitude of the operation member B, the user can distinguish the operation members due to differences in vibration amplitude of the perceived tactile feeling. Further, the vibration amplitude at the time at which a touch on the operation member A is detected and the vibration amplitude at the time at which a signal for a predetermined operation is output by pressing of the operation member A may be made different from each other. By the difference between the vibration amplitudes, the user can learn that an operation is being carried out solely from the vibration. By the setting of these operation members, the user can distinguish between the operation members, and confirm operations of the operation members by the vibration. FIG. 13B is a view schematically showing the vibration of each area of each operation member of FIG. 13A. Further, G5, G4, G3, and G2 respectively indicate the vibration of each area in a case where a touch on the operation member is detected, G5 indicates the vibration of an area 604b (area obtained by excluding an area 604a from the operation member B 604) of the operation member B 604, G4 indicates the vibration of an area 603b (area obtained by excluding an area 603a from the operation member A 603) of the operation member A 603, G3 indicates the vibration of the diagonally shaded area 604a of the operation member B 604, G2 indicates the vibration of the diagonally shaded area 603a of the operation member A 603, and G1 indicates the vibration of areas of the operation member A 603, and operation member B 604 in a case where the operation members are subjected to a pressing operation. It should be noted that when burst vibration shown in FIG. 14 is used as one of the methods for changing the tactile feeling of vibration, a more diversified vibration feeling can be realized. It becomes possible to create vibration in which a first burst time T1, and a second burst time T2 are added as variable parameters of vibration, and three variable parameters including the vibration amplitude, first burst time T1, and second burst time T2 are combined with each other. Even when a plurality of operation members are set to a vibration member 121 of one area, and vibration is simultaneously applied to the areas of the operation members, it becomes possible to make vibration interference between the three variable parameters hardly occur. Further, in FIG. 13A, the setting areas of the operation member A 603 and operation member B 604 overlap the area of the vibration member 121 in which vibration is generated. Here, setting may be made in such a manner that the setting areas of the operation members do not overlap the area in which vibration is generated. When such setting is employed, it is sufficient if amplitude and a phase of vibration generated in each vibration area are adjusted in such a manner that the vibration generated in the area to be vibrated overlaps the setting area of the operation member in a predetermined form.

Figures 15A, 15B:
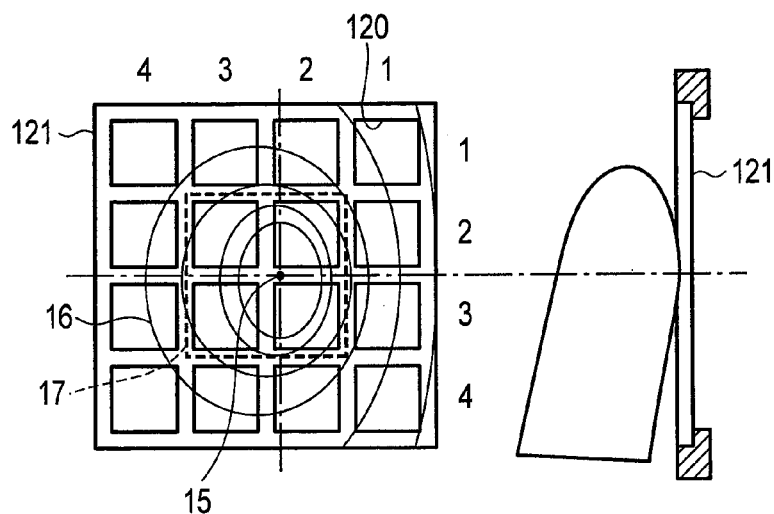
FIG. 15A is a schematic view showing an example of stress distribution of the vibration member pressed by a finger.
FIG. 15B is a schematic view showing an example of stress distribution of the vibration member pressed by a finger.

FIG. 15 shows views showing an example of stress distribution of the vibration member of a case where the vibration member 121 is pressed by a finger. In the case where the peripheral part of the vibration member 121 is fastened to the exterior, and the vibration member 121 is touched by a fingertip as shown in FIG. 15B, the vibration section 119 is displaced as indicated by the contour lines of stress 16 to thereby generate stress as shown in FIG. 15A. Here, the contour line of stress 16 is a line formed by plotting positions at which identical stress is generated. The closer an area of stress is to the touch center 15, the greater the stress is. Further, the farther an area of stress is from the touch center 15, the smaller the stress is. A voltage generated in each area of the touch detection section 120 of the vibration member 121 is proportionate to the stress occurring in each area, and hence it is possible to detect the stress center position at which the stress is the highest from the distribution of the voltage generated in each area. This stress center position is detected as the touch position. When the operation member 17 is set to the touch position and, furthermore, a voltage generated at the touch detection section 120 of an area to which the operation member 17 is set is greater than or equal to a predetermined value, each area corresponding to the operation member 17 makes the operator perceive the operation member 17 by generating predetermined vibration. Further, it goes without saying that this touch position is also used as the operation member setting position when the operation member is to be set.

Figure 16:
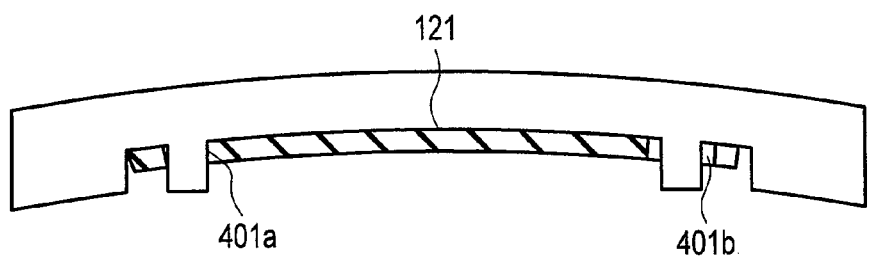
FIG. 16 is a view showing a modification example of a method of attaching a vibration member to the exterior.

A modification example of the embodiment will be described below. FIG. 16 shows a modification example of a method of attaching the vibration member 121 to the exterior. The vibration member 121 is fixed to the inner side of the exterior by adhesive bonding, and the fixing position is determined by fitting the holes 401a, and 401b of the vibration member 121 on the projections of the exterior. The hole 401a is circular. The hole 401b is an elongate hole, and prevents rotation around the hole 401a. In this case, when the exterior part is touched, touch detection is enabled by the stress generated at the touch detection section 120 of the vibration member 121 fixed to the exterior. When the vibration section 119 vibrates, the vibration is transmitted to the exterior, and the user can perceive the vibration through the exterior. Further, the material or the form of the exterior can freely be set, and hence it becomes possible to enhance the freedom of design of the apparatus.

Thus, according to this embodiment, it is possible to set the position of the operation member to an arbitrary position, and furthermore, give the user a tactile feeling based on vibration from the operation member, and make the user set the operation member without visually confirming the operation member. When normally using the apparatus, the user can set the operation member at a position desired by the user or with an operational feeling desired by the user. Further, when using the operation member, the user can very easily use the operation member which enables the user to confirm the position and type of the operation member from the tactile feeling of vibration.

Further, in the embodiment of the present invention, although the vibration member 121 is a push button, an operation member having a tactile feeling similar to a dial may also be employed. More specifically, by applying the burst vibration to the user's finger while switching the vibration area to the area to be touched by the user when the user slides his or her finger in the horizontal direction while touching the vibration member 121, it is possible to give the user such a feeling that he or she is operating a click-diaphragm dial.

Here, the vibration amplitude, burst time of the burst vibration, and burst interval are changed according to the form of the operation member. Further, the frequency or the like of vibration may be changed to an arbitrary frequency, and the tactile feeling may be changed by a change in frequency of vibration. It should be noted that in order to make the user perceive vibration, the vibration frequency may be made an audio frequency (20 Hz to 20 KHz). That is, a sound of the vibration frequency may be generated by the vibration of the vibration member 121. For example, in a case of a setting in which vibration of a large amplitude is generated when the vibration member 121 is pressed, a large sound is generated by the pressing, and hence the user can easily perceive the pressing by the auditory sense. Further, the vibration frequency may be a frequency on the higher-range side of the audio frequency (20 Hz to 20 KHz) or higher or a frequency on the lower-range side of the audio frequency. That is, no sound may be generated by the vibration of the vibration member 121 in order that the user will not perceive an unpleasant sound. Further, as another means for making the user perceive vibration, vibration of a burst waveform shown in FIG. 14 is effective. That is, as shown in FIG. 14, a period during which no vibration is generated and a period of the first burst time T1 during which vibration is generated are alternately repeated, whereby even when the vibration frequency is very high, it becomes possible for the user to sufficiently perceive a vibration tactile feeling.

Furthermore, the technique in the embodiment of the present invention is applicable not only to a digital camera, but also to various mobile terminals such as a cellular phone, and the like provided with an operation member.

It should be noted that among the techniques described in the embodiment, each of control techniques described mainly in connection with flowcharts can be set as a program in many cases. The program is stored in a recording medium or a recording section in some cases. The recording medium or the recording section may be one on which a program is recorded at the time of product shipment or may be a recording medium distributed and utilized or may be one on which a program downloaded through the Internet is recorded.

Furthermore, inventions of various stages are included in the embodiment of the present invention described above, and by appropriately combining a plurality of disclosed configuration requirements with each other, various inventions can be extracted. For example, even when any of the configuration requirements are deleted from all the configuration requirements, if the object described in the paragraph of "Object of the Invention" can be achieved and the advantage described in the paragraph of "Advantage of the Invention" can be obtained, the configuration after deletion of the configuration requirements can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operation apparatus comprising:
a vibration member arranged in a predetermined shape at a predetermined position of an exterior part capable of detecting a touch by a user and including a plurality of touch areas, the vibration member being configured to vibrate according to a signal output when a predetermined touch area is pressed;
a setting section configured to assign a predetermined function and an operation member corresponding to the predetermined function to each of the plurality of touch areas, and set a magnitude of vibration of each of the touch areas; and
a control section configured to control the vibration member to vibrate in a manner set according to the touched area when the predetermined touch area of the vibration member is touched by the user, control the operation apparatus to shift to a mode in which the predetermined function is performed, and allow the operation member to change settings in the mode.

2. The operation apparatus according to claim 1, wherein the vibration member comprises:
a touch detection section configured to detect an area touched by the user in the plurality of touch areas; and
a vibration section configured to generate vibration according to the touch area detected by the touch detection section.

3. The operation apparatus according to claim 1, wherein the vibration member is configured to vibrate in a burst vibration.

4. The operation apparatus according to claim 1, wherein a vibration amplitude corresponding to pressing that causes the vibration member to output the signal is greater than a vibration amplitude corresponding to pressing that does not cause the vibration member to output the signal.

5. The operation apparatus according to claim 1, wherein the vibration member is configured to vibrate at an audio frequency.

6. The operation apparatus according to claim 1, wherein the vibration member is formed of a flexible material with piezoelectric properties.

7. The operation apparatus according to claim 6, wherein the flexible material with piezoelectric properties is formed of poly-L-lactic acid or poly-D-lactic acid.

8. The operation apparatus according to claim 1, wherein the vibration member comprises a structure in which a sheet formed of poly-L-lactic acid and a sheet formed of poly-O-lactic acid are alternately laid one on top of each other.

9. The operation apparatus according to claim 1, wherein the touch area of the vibration member vibrates in proportion to stress based on the pressing.

10. The operation apparatus according to claim 1, wherein:
the setting section includes a display configured to display an image; and
the control section displays the predetermined functions and the operation members corresponding to the predetermined functions in order on the display to allow selection of any one of the predetermined functions and the operation members corresponding to the predetermined function.

* * * * *